United States Patent
Hara et al.

(10) Patent No.: US 9,020,214 B2
(45) Date of Patent: Apr. 28, 2015

(54) STRIPED PATTERN IMAGE EXAMINATION SUPPORT DEVICE, STRIPED PATTERN IMAGE EXAMINATION SUPPORT METHOD AND PROGRAM

(75) Inventors: Masanori Hara, Tokyo (JP); Hiroaki Toyama, Tokyo (JP)

(73) Assignees: NEC Corporation, Tokyo (JP); NEC Solution Innovators, Ltd., Tokyo (JP)

( * ) Notice: Subject to any disclaimer, the term of this patent is extended or adjusted under 35 U.S.C. 154(b) by 513 days.

(21) Appl. No.: 13/390,641

(22) PCT Filed: Aug. 20, 2010

(86) PCT No.: PCT/JP2010/064536
§ 371 (c)(1),
(2), (4) Date: Feb. 15, 2012

(87) PCT Pub. No.: WO2011/024927
PCT Pub. Date: Mar. 3, 2011

(65) Prior Publication Data
US 2012/0140996 A1 Jun. 7, 2012

(30) Foreign Application Priority Data
Aug. 25, 2009 (JP) ................................. 2009-193847

(51) Int. Cl.
*G06K 9/00* (2006.01)
*G06K 9/50* (2006.01)
*G06T 7/00* (2006.01)

(52) U.S. Cl.
CPC ..... *G06T 7/0028* (2013.01); *G06T 2207/10004* (2013.01); *G06K 9/00067* (2013.01); *G06T 7/0024* (2013.01); *G06K 9/00087* (2013.01); *G06K 9/50* (2013.01)

(58) Field of Classification Search
None
See application file for complete search history.

(56) References Cited

U.S. PATENT DOCUMENTS 5,960,101 A * 9/1999 Lo et al. ......................... 382/125
6,111,978 A * 8/2000 Bolle et al. .................... 382/125
(Continued)

FOREIGN PATENT DOCUMENTS

JP    7-160236    6/1995
JP    2885787    4/1999
(Continued)

OTHER PUBLICATIONS

International Search Report, PCT/JP2010/064536, Sep. 28, 2010.
(Continued)

*Primary Examiner* — Kim Vu
*Assistant Examiner* — Nathan Bloom
(74) *Attorney, Agent, or Firm* — Young & Thompson

(57) ABSTRACT

Provided are a striped pattern image examination support device, method, and program. The device includes: image transformation element for transforming at least one of two striped pattern images so as to cause coordinates of charting points, which are points that correspond across the two striped pattern images, to match in a plurality of pairs of the charting points which are included in the two striped pattern images; intersecting point extraction element for calculating coordinates of intersecting points of stripes in the striped pattern images and line segments each of which connects two of the charting points in the striped pattern images; charting diagram display element for displaying the two striped pattern images after transformation by the image transformation element, and displaying figures representing charting points at positions corresponding to coordinates after the transformations of each of the charting points on the two striped pattern images.

12 Claims, 30 Drawing Sheets

(56) References Cited

U.S. PATENT DOCUMENTS

| | | | |
|---|---|---|---|
| 7,151,846 B1 * | 12/2006 | Fujii | 382/125 |
| 7,260,246 B2 | 8/2007 | Fujii | |
| 7,333,641 B2 | 2/2008 | Hara et al. | |
| 2002/0061125 A1 | 5/2002 | Fujii | |
| 2002/0176627 A1 * | 11/2002 | Monden | 382/219 |
| 2003/0039382 A1 * | 2/2003 | Yau et al. | 382/125 |
| 2004/0101173 A1 | 5/2004 | Hara et al. | |
| 2004/0258284 A1 * | 12/2004 | Daniel et al. | 382/124 |
| 2008/0187095 A1 * | 8/2008 | Boone et al. | 378/37 |
| 2013/0216106 A1 * | 8/2013 | Hara et al. | 382/115 |

FOREIGN PATENT DOCUMENTS

| | | |
|---|---|---|
| JP | 2002-109543 | 4/2002 |
| JP | 2003-036443 | 2/2003 |
| JP | 2004-078434 | 3/2004 |
| JP | 2004-295383 | 10/2004 |
| JP | 2007-272470 | 10/2007 |

OTHER PUBLICATIONS

John Edgar Hoover, "The Science of Fingerprints Classification and Uses" US DOJ, FBI; Rev 12-84, 1990, p. 193-196.

* cited by examiner

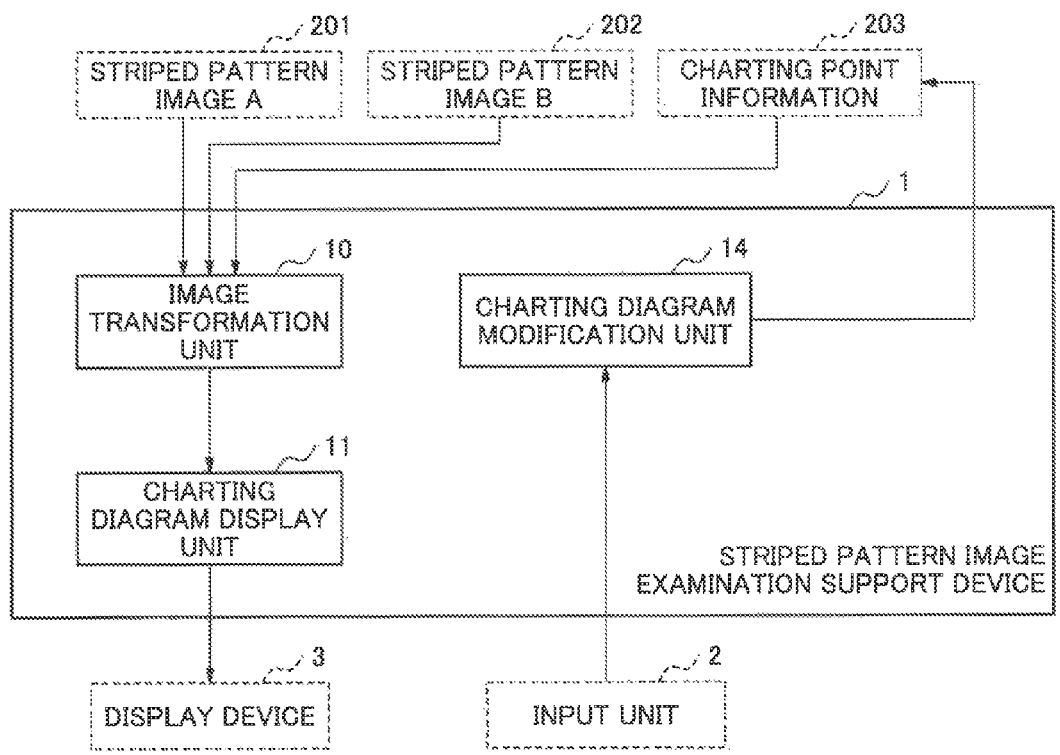
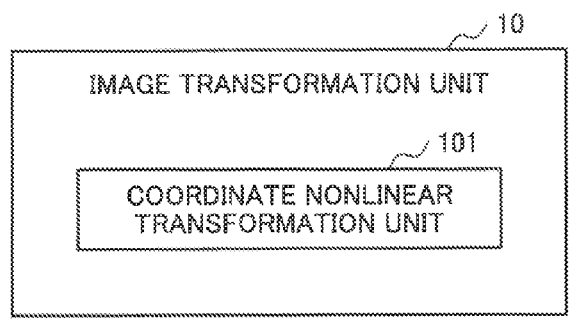

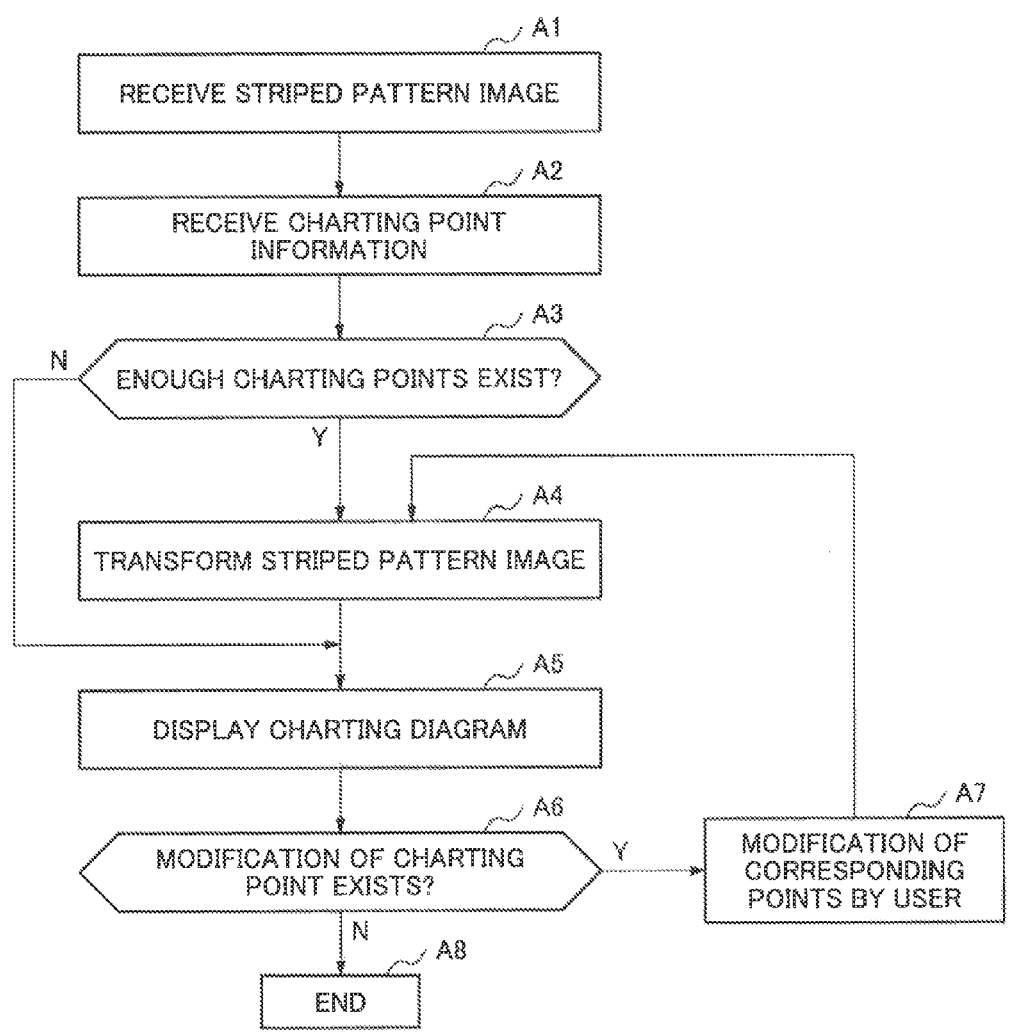

STRIPED PATTERN IMAGE EXAMINATION SUPPORT DEVICE, STRIPED PATTERN IMAGE EXAMINATION SUPPORT METHOD AND PROGRAM

TECHNICAL FIELD

The present invention relates to a striped pattern image examination support device, a striped pattern image examination support method and a program, which support difference judgment between striped pattern images and in particular, relates to a striped pattern image examination support device, a striped pattern image examination support method and a program, which support examination (difference judgment) of two images such as fingerprint images or palmprint images.

BACKGROUND ART

Because a fingerprint including a large number of striped pattern-like ridges is said to include two major features such that it is invariable lifelong and unique to each individual, it has been used as a means to identify individuals for many years.

In a fingerprint examination, that is, a difference judgment of fingerprints for judging whether two fingerprints are of the identical finger, an examiner had compared two fingerprint images with the eye, and judged whether feature points existed at corresponding positions on ridges of both fingerprints by visual observation. And when the number of the feature points which formed a pair in the two fingerprints, that is, the feature points which existed at corresponding positions on the ridges of both of the fingerprints, was more than a given number, the examiner had judged that those two fingerprints were from the identical finger. Further, a ridge is a line-like bulge which exists on a skin of a finger or a palm, or a stripe-like pattern of a fingerprint or a palmprint impressed by the line-like bulge.

In a fingerprint image or a palmprint image, a feature point often indicates only an ending point or a bifurcation point of a ridge which forms a stripe. Also, feature points which form a pair on two images (in this case, fingerprint images) are paired feature points.

In a trial, together with two of fingerprint pictures or fingerprint gray images which are placed side by side, material which shows the identified relation between paired feature points is submitted. An example of the material mentioned above submitted in a trial is disclosed in a non-patent document 1.

In recent years, a fingerprint matching system using a computer is spreading, and accordingly, evidentiary material for trials is also often created using a computer. Generally speaking, charting is to display two fingerprint images side by side, to connect paired feature points of the two fingerprint images by a line, and to enter a number assigned to the paired feature points. Also, in a system for creating material for trials by a computer, a function to display two fingerprints and to support a manual input or modification of paired feature points is a charting function (Charting Function).

A computer equipped with the charting function often displays two fingerprints, which are targets of a difference judgment, placed side by side. Such a display method is side by side display. A figure or a screen with the side by side display is also called a charting diagram or a charting screen. Also, two corresponding points are charting points. A line which connects two charting points which are often displayed on the charting screen is a charting line.

When identifying a charting point, an examiner usually counts by visual observation the number of ridges that exist between the target charting point and a charting point in the neighborhood on two fingerprint images which are included in a judgment target. In case the counted number of crossing ridges matched between two fingerprints of the judgment target, the examiner judged that the identified charting point was correct.

An example of a feature point display device which performs charting automatically is disclosed in Patent document 1.

The feature point display device of Patent document 1 includes a fingerprint information input unit, a display unit, a calculation unit, a numbering unit, a determination unit, a decision unit, a control unit and a detection unit, and operates roughly as follows.

The fingerprint information input unit finds a core of a fingerprint from two inputted fingerprint images. The calculation unit detects feature points from each fingerprint image and calculates distances between the detected feature points and the core of the fingerprint. The numbering unit assigns a number to each of the detected feature points. The determination unit calculates, in numerical order of the number assigned to the feature point, between each of the feature points of one fingerprint image and each of the feature points of other fingerprint image, a degree of certainty which is calculated based on a position and so on of each of the feature points and which indicates a degree that two feature points match. The decision unit extracts each feature point pair whose degree of certainty exceeds a predetermined threshold value, and, in order of the number that is assigned to the feature point detected in one fingerprint, assigns a number to each of the extracted feature point pairs. The detection unit deletes each feature point pair designated by user's operation. The control unit makes the display unit display each of the feature point pairs which are assigned the number by the decision unit and which are not deleted by the decision unit. The display unit displays the two fingerprint images side by side, and further displays each of the feature point pairs in the fingerprints, each line which connects the feature points which form a feature point pair, and the number assigned to each of the feature point pairs, by overlaying them on the fingerprint image.

In Patent document 2, an example of a fingerprint correction display method is disclosed which displays two fingerprint images by a fingerprint display device after correcting one fingerprint image based on the other fingerprint image.

Correction method of Patent document 2 includes a process that detects corresponding feature points in the two fingerprint images, a process that calculates a distance between the detected feature point and a fingerprint core, a process that calculates a ratio of the distances each of which is the distance between the corresponding feature point and the fingerprint core, and a process that corrects one fingerprint image according to the calculated ratio of the distances. The correction method of the fingerprint display device of Patent document 2 is roughly as follows.

The fingerprint display device first detects feature points from the two fingerprint images respectively. Next, the fingerprint display device detects feature points which corresponds each other, among the feature points detected on each of the fingerprint images. The fingerprint display device calculates the distance between each of the detected corresponding feature points and the fingerprint core, for each of the fingerprints, and calculates the ratio of the distances. The fingerprint display device further performs correction which transforms, using one fingerprint image as a standard, other fingerprint image according to the calculated ratio of the distances.

An example of a striped pattern image examination device which displays feature data of two fingerprint images for which a difference judgment is performed is disclosed in Patent document 3.

The striped pattern examination device of Patent document 3 includes a fingerprint feature data extraction means, a feature point data matching means, a skeleton data matching means, a correspondence relationship modification means, an image distortion modification means, and an image displaying means and operates roughly as follows.

The fingerprint feature data extraction means extracts, from the two fingerprint images which are to be examined, a skeleton which is a thinned ridge of the fingerprint image, and extracts a feature point (ending point and bifurcation point) of the fingerprint. The feature point data matching means corresponds feature points which form a pair on the two fingerprint images and extracts all the pairs of the feature points.

The skeleton data matching means corresponds skeleton points extracted from the two fingerprint images and extracts pairs of the skeleton points. A skeleton point is a point that constitutes a skeleton.

The correspondence relationship modification means makes an examiner modify correspondence relationship of the points which forms a pair. The modification of the correspondence relationship of the points includes addition of correspondence relationship which makes points not forming a pair into a pair, deletion of correspondence relationship of the points forming a pair, and modification which moves the position of at least one of the points forming a pair.

The image distortion modification means modifies distortion of one fingerprint image based on positions of feature points forming a pair and skeleton points forming a pair. The skeleton point may use all of the skeleton points, or may use, for example, the skeleton points selected at a predetermined interval on the skeletons of one fingerprint and the corresponding skeleton points of the other fingerprint image. The image distortion modification means defines a vector the starting point of which is a position of a point of a pair on one image and the end point of which is a position of the other point of the pair on the other image, and, based on the vector, modifies image data and skeleton data around the point, on the fingerprint to be modified.

The image display means overlays one image and other modified image and displays them.

PRECEDING TECHNICAL LITERATURE

Patent Document

[Patent document 1] Japanese Patent Application Laid-Open No. 2003-036443

[Patent document 2] Japanese Patent Publication No. 2885787

[Patent document 3] Japanese Patent Application Laid-Open No. 2004-078434

Non-Patent Document

[Non-patent document 1] Pages 193-196 of "The Science of Fingerprints Classification and Uses" (by John Edgar Hoover, US DOJ, FBI; Rev. 12-84, 1990)

A BRIEF SUMMARY OF THE INVENTION

Problems to be Solved by the Invention

Generally speaking, because a surface of a finger and a palm is soft and easy to deform, shapes of a fingerprint or a palmprint collected as an image are different for each image even for the same finger or the palm. Therefore, even if two fingerprint images or two palmprint images, which are of an examination target, are from the identical fingerprint or the palmprint, and even if by parallel movement or rotation to make positions of feature points be placed one over another, the two fingerprint images or the two palmprint images do not overlap one another.

Further, in case one of the fingerprint images of an examination target is a fingerprint which includes an area where a ridge is not clear because the quality of the fingerprint image is poor, which is, for example, a latent fingerprint and so on, reading of the ridge which exists between the feature points in the neighborhood is difficult. In the case, because counting the number of ridges is difficult, an examiner tends to err in judgment of whether the numbers of ridges match. Further, when a latent fingerprint and an impression fingerprint are displayed for examination with only the position and the direction being matched, in case deformation of the fingerprint are large, even if the magnification ratio of the fingerprints is the same, positions of feature points of both of the fingerprints are often set apart. Therefore, burden of the examiner was heavy.

However, the feature point display device described in Patent document 1 does not correct the fingerprint image to be displayed. Therefore, on a fingerprint image with a large deformation, relative positions of feature points from the core of the fingerprint may be different greatly on two images even for the feature points which form a pair. In such case, there was a problem that a pair of feature points cannot be extracted correctly. Also, in case deformation of the fingerprint image are large, even if display positions of the cores of the fingerprints on the images are made to match, there was a problem that the display positions of the feature points which form a pair are different greatly.

Generally speaking, a judge who performs difference determination of fingerprints needs to determine whether an extracted pair of feature points is correct or not by visual observation, to delete a pair of feature points which is erroneously determined as a pair, and to add a pair of feature points which is erroneously not determined as a pair. Accordingly, in case there are a lot of pairs of feature points which are erroneously determined as a pair, or pairs of feature points which are erroneously not determined as a pair, work amount of the judge increases. Also, in case relative positions of feature points which form a pair are different across the two fingerprint images greatly, compared with a case where display positions are near, burden of identification work of the judge becomes even more heavily. The reason is, in case relative positions of corresponding feature points are different greatly across the fingerprint images of the determination target, not only positions of parts to be observed are different greatly but also deformation of the fingerprint across the fingerprint images of the determination target is large.

Also, in the feature point display device described in Patent document 1 and in the fingerprint correction display method described in Patent document 2, in order to extract a pair of feature points, it is necessary that the position of the core of the fingerprint is specified. Therefore, in the technology of Patent document 1 and 2, there is a problem that a pair of feature points can not be extracted from the fingerprint image in case of, for example, like an arch pattern, a fingerprint without a core of the fingerprint. Also, in the technology of Patent document 1 and 2, there was a problem that, in case of a fingerprint image not including a core of the fingerprint which is often the case, for example, in a latent fingerprint which is a fingerprint left on a surface of a thing, the core cannot be extracted from the fingerprint image.

Also, the striped pattern image examination device described in Patent document 3 modifies an image or data, and extracts points which form a pair, based on a skeleton extracted from the fingerprint image. Therefore, in the technology of Patent document 3, there was a problem, in case of a fingerprint image of poor quality, which often exist, for example, among latent fingerprint images, that correct automatic extraction of a skeleton from the fingerprint image can not be performed and automatic extraction of points which form a pair from the fingerprint images cannot be performed.

Further, in the feature point display device described in Patent document 1, in the fingerprint correction display method described in Patent document 2, and in the striped pattern image examination device described in Patent document 3, fingerprint images, feature points determined as a pair, lines which show that feature points are a pair, and numbers assigned to the feature point pair are displayed only. Therefore, in the technology of Patent document 1-3, in identifying the feature point pair by the fingerprint examiner, there was a problem that the number of ridges has to be counted by visual observation in order to determine whether the number of ridges that exist between the target feature point and the feature point in the neighborhood match.

The object of the present invention is to provide a striped pattern image examination support device, a striped pattern image examination support method and a program for supporting striped pattern image examination which solved the problems mentioned above and which judges whether two striped pattern images are formed by the identical target.

Measures for Solving the Problems

A striped pattern image examination support device comprises: image transformation means for transforming at least one of two striped pattern images so that coordinates of a pair of charting points, which are points that correspond across the two striped pattern images, match for a plurality of pairs of the charting points which are included in the two striped pattern images; intersecting point extraction means for calculating coordinates of intersecting points of stripes in the striped pattern images and line segments each of which connects two of the charting points in the striped pattern images; charting diagram display means for displaying the two striped pattern images after transformation by the image transformation means, and displaying figures representing charting points at positions corresponding to coordinates of each of the charting points after the transformations on the two striped pattern images; and intersecting points display means for displaying figures representing intersecting points at positions corresponding to coordinates of the intersecting points after the transformations on the two striped pattern images after the transformations displayed by the charting diagram display means.

A striped pattern image examination support method comprises: transforming at least one of two striped pattern images so as to cause coordinates of charting points, which are points that correspond across the two striped pattern images, to match in a plurality of pairs of the charting points which are included in the two striped pattern images; calculating coordinates of intersecting points of stripes in the striped pattern images and a line segment which connects two of the charting points in the striped pattern images; displaying the two striped pattern images after the transformation, and displaying figures representing charting points at positions corresponding to coordinates after the transformations of each of the charting points on the two striped pattern images; and displaying figures representing intersecting points at positions corresponding to coordinates after the transformations of the intersecting points on the two striped pattern images after the transformations.

A non-transitory computer readable medium embodies a striped pattern image examination support program which makes a computer execute: an image transformation process which transforms at lest one striped pattern image of either of two striped pattern images so as to cause coordinates of charting points, which are points that correspond across the two striped pattern images, to match in a plurality of pairs of the charting points which are included in the two striped pattern images; an intersecting point extraction process which calculates coordinates of intersecting points of stripes in the striped pattern images and a line segment which connects two of the charting points on the striped pattern images; a charting diagram display process which displays the two striped pattern images after transformation by way of the image transformation process, and displays figures representing charting points at positions corresponding to coordinates after the transformations of each of the charting points on the two striped pattern images; and an intersecting point display process which displays figures representing intersecting points at positions corresponding to coordinates after the transformations of the intersecting points on the two striped pattern images after the transformations displayed by the charting diagram display process.

Effect of the Invention

The present invention has, in a striped pattern image examination support device which supports examination for judging whether two fingerprint images are fingerprints of the identical finger, an effect that amount of work when an examiner modifies a charting point decreases. Also, at the time an examiner identifies a charting point, and in determination of whether numbers of ridges that exist between a charting point and charting points in the neighborhood match, it has an effect that can reduce the burden of identification work by making the work in which the examiner counts the number of ridges by visual observation unnecessary.

BRIEF DESCRIPTION OF THE DRAWINGS

[FIG. 1] A figure showing a striped pattern image examination support device related to the present application.

[FIG. 2] A figure showing a striped pattern image examination support device related to the present application and an image transformation unit in the first and the second exemplary embodiment.

[FIG. 3] A flow chart showing operation of a striped pattern image examination support device related to the present application.

Figure 4:
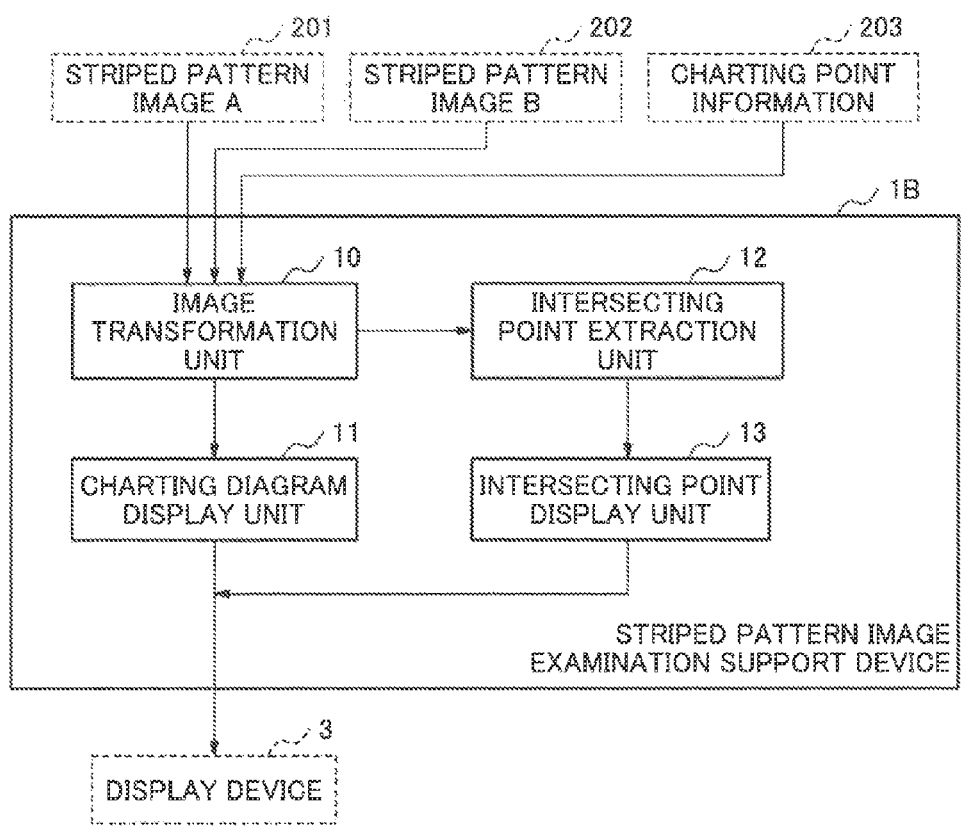
[FIG. 4] A figure showing a striped pattern image examination support device in the first exemplary embodiment.

FIG. [19] An example of an impression fingerprint image on which extracted intersecting points are overlaid and displayed.

FIG. [20] An example of a latent fingerprint on which intersecting points extracted from a paired impression fingerprint are overlaid and displayed.

FIG. [21] An example of a latent fingerprint which shows an intersecting point before modification.

FIG. [22] An example of a latent fingerprint which shows an intersecting point after modification.

FIG. [23] An example of an impression fingerprint which shows an intersecting point corresponding to an intersecting point modified based on a paired latent fingerprint.

FIG. [24] An example of a latent fingerprint on which charting points and intersecting points extracted from a paired impression fingerprint after linear transformation are overlaid and displayed.

FIG. [25] An example of an impression fingerprint after linear transformation on which charting points and extracted intersecting points are overlaid and displayed.

FIG. [26] An example of a latent fingerprint on which charting points and intersecting points extracted from a paired impression fingerprint after nonlinear transformation are overlaid and displayed.

FIG. [27] An example of an impression fingerprint after nonlinear transformation on which charting points and extracted intersecting points are overlaid and displayed.

FIG. [28] An example of charting diagrams of an latent fingerprint and an impression fingerprint which are erroneously examined as an identical finger.

FIG. [29] An example of a latent fingerprint of which examination erred.

FIG. [30] An example of an impression fingerprint of which examination erred.

FIG. [31] An example of an enlarged image of a latent fingerprint on which feature points and intersecting points extracted from an impression fingerprint after nonlinear transformation are overlaid and displayed.

FIG. [32] An example of an enlarged image of an impression fingerprint on which feature points and extracted intersecting points are overlaid and displayed.

FIG. [33] An example of an enlarged image of a latent fingerprint on which feature points and intersecting points which are extracted from an impression fingerprint after nonlinear transformation and the positions of a part of which are modified, are overlaid and displayed.

DESCRIPTION OF CODE 1, 1B, 1C, 1D, 1E Striped pattern image examination support device
2 Input unit
3 Display device
10, 10D, 10E Image transformation unit
11 Charting diagram display unit
12 Intersecting point extraction unit
13 Intersecting point display unit
14 Charting point modification unit
15 Intersecting point modification unit
16 Double cursor unit
17 Image quality determination unit
18 Display image selection unit
101 Coordinate nonlinear transformation unit
102 Coordinate linear transformation unit
201 Striped pattern image A
202 Striped pattern image B
203 Charting point information
A, B Charting point
Mode for Carrying out the Invention Next, the present invention will be described in detail with reference to drawings.

First, before describing an exemplary embodiment of the present invention, an example of a striped pattern image examination support device will be described.

FIG. 1 is a figure showing a structure of the striped pattern image examination support device according to Japanese Patent Application No. 2009-074501 which is related to the present invention.

Referring to FIG. 1, the striped pattern image examination support device 1 includes an image transformation unit 10, a charting diagram display unit 11 and a charting point modification unit 14. Also, a display device 3 is connected to the striped pattern image examination support device 1.

The image transformation unit 10 obtains, from two striped pattern images (striped pattern image A 201 and striped pattern image B 202) and charting point information 203 inputted by a user, transformation by which coordinates of charting points in the two striped pattern images match for a plurality of charting points, and transforms coordinates of the points at least included in either of the striped pattern images.

The striped pattern image is, for example, a fingerprint image or a palmprint image which photographed a fingerprint or a palmprint, and in which a striped area is included. However, the striped pattern image may be a striped image including an ending point or a bifurcation point, and is not limited to a fingerprint image or a palmprint image.

As mentioned above, because a finger and a palm are soft and the surface is not planar but three dimensional, when a fingerprint image or a palmprint image is obtained from a fingerprint or a palmprint by a sensor, the surface of the finger or the surface of the palm touched with the sensor is deformed. Also, according to a location of the finger or the palm where it touches the sensor, or amount of power with which the finger or the palm touches the sensor, the surface of the finger or the surface of the palm is deformed into a different shape. Accordingly, even for a fingerprint image obtained from the identical part of the identical fingerprint or a palmprint image obtained from the identical part of the identical palmprint, shapes of the stripe in a striped pattern part derived from the fingerprint or the palmprint may not always be identical.

A charting point is, among feature points included in two striped pattern images, a feature point which is judged as a feature point extracted from the same part of the striped pattern across both of the striped pattern images (that is, a feature point which is judged to correspond). In the following description, "charting point" is a point on either of the striped pattern images among the corresponding feature points across the two striped pattern images. Also, "set of charting points" is a set of a feature point in one image and a corresponding feature point in the other image. Also, "a plurality of charting points" is a plurality of feature points which are included in one image and to each of which a feature point in the other image corresponds.

As stated above, on a fingerprint image or a palmprint image, a feature point often indicates an ending point or a bifurcation point of a ridge which forms a stripe. However, in difference judgment of a fingerprint, not only a feature point such as an ending point or a bifurcation point, other features of the ridge, for example, such as a short line (dot) and a sweat pore, are often used. In the following, the feature point includes not only the ending point and the bifurcation point but also the other features of the ridge.

A feature point may be a feature point which a computer has extracted from a striped pattern image automatically by an existing arbitrary method, or may be a feature point which a user has selected. Judgment that two feature points, which are included in different striped pattern images respectively, correspond to each other, may be performed by a computer automatically using an existing arbitrary method, or may be performed by a user.

The charting point information 203 includes coordinates of charting points on both of the striped pattern images and numbers assigned to the charting points respectively.

First, the image transformation unit 10 calculates transformation which transforms coordinates (relative coordinates), at a time of transformation, of a charting point in the striped pattern image in which the charting point is included so as to match on both of the striped pattern images. The transformation of coordinates which the image transformation unit 10 obtains is expressed in the form of, for example, transformation expression and its parameters in case the transformation can be expressed by a numerical expression, a transformation table including coordinates of each point on the image before and after the transformation, or their combination. Calculation of the transformation is performed by calculating the above-mentioned transformation expression and parameters or the above-mentioned transformation table which represent the transformation. The image transformation unit 10 may calculate the above-mentioned transformation by using coordinates values of the charting points the coordinates of which are matched by the transformation.

By the calculated transformation, the image transformation unit 10 transforms the striped pattern image. The image transformation unit 10 may perform the transformation of a striped pattern image by, for example, moving each pixel from a position of each pixel before the transformation to a destination of a movement by the transformation of the each pixel while maintaining the pixel value. In case of the transformation by moving a position of a pixel, the position of the pixel after the transformation may not be at even intervals. Accordingly, the image transformation unit 10 may, as is generally often performed, generate images after the transformation by further calculating a pixel value of a pixel placed at even intervals by interpolation from the coordinates and the pixel value of each pixel after the movement. Further, although coordinates of any points can be used in order to calculate transformation as far as they are points having correspondence across two images, calculation of the transformation is usually performed using coordinates of feature points which have correspondence.

Transformation may be performed to both of the striped pattern images, or may be performed to either of the striped pattern images. The following description is an explanation in case the transformation is performed to either of the striped pattern images. The image transformation unit 10 performs transformation of a striped pattern image by an existing method disclosed, for example, in Japanese Patent Application Laid-Open No. 1995-114649.

FIG. 2 is a figure showing a structure of the image transformation unit 10 in case transformation is performed by nonlinear transformation disclosed in Japanese Patent Application Laid-Open No. 1995-114649.

Referring to FIG. 2, the image transformation unit 10 includes a coordinate nonlinear transformation unit 101. The image transformation unit 10 in case the coordinate nonlinear transformation unit 101 performs transformation of coordinates by nonlinear transformation disclosed in Japanese Patent Application Laid-Open No. 1995-114649 will be described.

First, the coordinate nonlinear transformation unit 101 obtains the nonlinear transformation across two images as follows. The coordinate nonlinear transformation unit 101 expresses the nonlinear transformation across the two images as a movement from each pixel of one image to a corresponding pixel on other image. That is, the coordinate nonlinear transformation unit 101 expresses the nonlinear transformation as a combination of coordinates of all pixels on one image among two images and a movement vector which represents the movement of the pixel by the transformation. First, the coordinate nonlinear transformation unit 101 obtains a movement vector of a charting point from the coordinates of the charting point which have correspondence on two images. Next, the coordinate nonlinear transformation unit 101 obtains movement vectors from all pixels of one image to the corresponding points on the other image using interpolation based on movement vectors of charting points obtained and distances to charting points in the neighborhood. The coordinate nonlinear transformation unit 101 obtains the correspondence relationship between coordinates before the movement and coordinates after the movement for all the pixels from the coordinates of each pixel and the movement vectors obtained, and creates a coordinate transformation table expressing the obtained correspondence relationship between the coordinates before the movement and the coordinates after the movement. Similarly, the coordinate nonlinear transformation unit 101 creates a coordinate transformation table which is the correspondence relationship of the coordinates obtained when reversing the relationship between the two images.

Next, the coordinate nonlinear transformation unit 101 decides, from the coordinates of all pixels of an image which is the transformation target before the transformation, the coordinates of all pixels after the transformation using the coordinate transformation table obtained. The coordinate nonlinear transformation unit 101 performs the nonlinear transformation of the image which is the transformation target by moving all the pixels of the image witch is the transformation target to the positions which the coordinates after the obtained transformation mentioned above indicate.

The image transformation unit 10 generates an image for outputting to an output device by an existing method, for example, such as by reconstructing by way of interpolation from the pixel value of each pixel of the original image and the coordinates of each pixel after the transformation.

The charting diagram display unit 11 overlays, on the two striped pattern images after the transformation, the charting points and figures which show that the overlaid charting points are charting points, and displays them.

The charting diagram display unit 11 displays the two striped pattern images by placing them, for example, side by side (by side by side display), and displays figures, such as points or small circles which represent charting points, at positions where the charting points of the striped pattern image exist. Further, the charting diagram display unit 11 displays figures, which show that the charting points correspond. The figures which show that the charting points correspond are, for example, lines which connect the charting points of both of the striped pattern images and are displayed with numbers assigned to the charting points, or numbers assigned to the charting points, which are displayed at some positions, and lines which connect the displayed numbers with the charting points of both of the striped pattern images. The figure in which the overlaid two striped pattern images, the charting points, and the figures which specify that the charting points correspond to each other, which are mentioned above, are displayed is a charting diagram.

The charting diagram display unit 11 displays the charting diagram on the display device 3 such as a display.

The charting point modification unit 14, by user's operation using the input device 2 such as a pointing device, for example, a mouse or a tablet, and a keyboard, performs addition or deletion of a charting point, or modification of a position of the charting point. Because the charting points correspond to each other across two images, the charting point modification unit 14 performs addition and deletion of the charting points simultaneously on both the images. On the other hand, the charting point modification unit 14 performs modification of the position of the charting points on two images independently.

Next, operation of the striped pattern image examination support device of FIG. 1 will be described in detail with reference to drawings FIG. 3 is a flow chart showing operation of the striped pattern image examination support device 1.

Referring to FIG. 3, first, the image transformation unit 10 of the striped pattern image examination support device 1 receives two striped pattern images (Step A1) and charting point information of the two striped pattern images (Step A2). The striped pattern image examination support device 1 may receive the striped pattern images from an image input device such as a sensor and a scanner, or image data which is digitized and stored in advance as the striped pattern images. The charting point information may be created and stored in advance, may be obtained from the received image by calculation, or may be obtained through selection by visual observation and manual input.

In case a charting point exists (Step A3, Y), the image transformation unit 10 obtains transformation which makes relative coordinates of a plurality of charting points match by transforming relative coordinates of the charting points of either of the striped pattern images from the received charting point information 203 and performs transformation of the received striped pattern image (Step A4).

The charting diagram display unit 11 displays a charting diagram after the transformation on the display device 3 (Step A5).

The user who identified the charting point by the charting diagram displayed on the display device 3 will, in case it is judged that the charting point to be modified exists (Step A6, Y), modify the charting point (Step A7).

In case the user judged that the charting point to be modified does not exist (Step A6, N), the processing ends (Step A8). After the processing ends, the user may print the charting diagram by an output device such as a printer which is not illustrated.

Although a case in which enough number of charting points exist for the image transformation unit 10 to obtain the transformation at the time the processing starts in Step A4 was described above, enough number of charting points do not have to exist necessarily at the time the processing starts. In that case (Step A3, N), the charting diagram display unit 11 first displays a striped pattern image which is not transformed by the image transformation unit 10 (Step A5). The user identifies presence of a charting point of the displayed striped pattern image by visual observation, and in case a charting point exists (Step A6, Y), adds the charting point by the charting point modification unit 14 (Step A7). The operation of the striped pattern image examination support device 1 after that is the same as the operation in case the charting point information exists.

As stated above, in the example of this striped pattern image examination support device, there is an effect that can reduce the burden of the user's striped pattern image examination work. The reason is because the charting points judged to correspond at that moment always exist at the same relative position on two of the striped pattern images to be compared. By matching the relative positions of the charting points to be compared by the image transformation unit, the user can observe the same part on the two striped pattern images. Also, by the transformation by the image transformation unit which makes the relative positions of the charting points match, differences in the transformation of the striped pattern images of the observation targets can be reduced.

Above description is a description about an example of a striped pattern image examination support device. The preceding example in the exemplary embodiments of the present invention described below is the example of the striped pattern image examination support device explained above. In the following explanation, description will be made mainly on a point of difference of the preceding example and the exemplary embodiments of the present invention. Further, the element of the exemplary embodiments of the present invention to which the same code as the element of the preceding example is assigned is the same as the element of the preceding example with the identical code.

Next, the first exemplary embodiment of a striped pattern image examination support device of the present invention will be described in detail with reference to drawings.

FIG. 4 is a figure showing a structure of the striped pattern image examination support device according to this exemplary embodiment.

Referring to FIG. 4, the striped pattern image examination support device 1B includes an image transformation unit 10, a charting diagram display unit 11, an intersecting point extraction unit 12 and an intersecting point display unit 13. Also, a display device 3 such as a display is connected to the striped pattern image examination support device 1B.

The image transformation unit 10 and the charting diagram display unit 11 of this exemplary embodiment are the same as the image transformation unit 10 and the charting diagram display unit 11 of the preceding example of the present invention respectively.

The intersecting point extraction unit 12 first extracts coordinates of intersecting points before transformation from the two striped pattern images before transformation and charting point information. That is, the intersecting point extraction unit 12 extracts, on one striped pattern image of the received two striped pattern images, coordinates of all intersecting points of a line segment which connects the neighboring charting points and stripes which cross the line segment. The neighboring charting point is, for example, a charting point whose distance from the noted charting point is no more than a constant value. Or, the neighboring charting points may be the n nearest charting points from the noted charting point, where n is a predetermined number. Also, the intersecting point extraction unit 12 may calculate coordinates of the intersecting points on a line segment which connects charting points for all pairs of charting points. Also, the intersecting point extraction unit 12 may calculate coordinates of the intersecting points which exist on a line segment which connects a pair of charting points selected by the user's designation.

The intersecting point extraction unit 12 calculates, for example, coordinates of an intersecting point of a skeleton which is a thin line generated by thinning a stripe included in a binary striped pattern image and a line segment which connects charting points as the coordinates of the intersecting point of the stripe and the line segment which connects the charting points. As a method of thinning, for example, there is a method indicated in ""Handbook of Fingerprint Recognition" pp. 83-113, D. Maltoni, et al., Springer". Thinning and calculation of intersecting point coordinates may be performed by other existing methods. Also, thinning of the striped pattern image may be performed by the intersecting point extraction unit 12. Or, the intersecting point extraction unit 12 may read skeleton data which is obtained by thinning performed in advance and which is stored in a memory unit which is not illustrated from the memory unit which is not illustrated Next, the intersecting point extraction unit 12 calculates coordinates of a point which corresponds to an intersecting point, whose coordinates are calculated, in one striped pattern image, in the other striped pattern image. The calculation of the coordinates can be performed, for example, by proportional calculation using the coordinates of the two charting points in one image, relative positions of the intersecting points in the line segment which connect the charting points, and the coordinates of the corresponding two charting points in the other image.

Next, the intersecting point extraction unit 12 calculates coordinates of the intersecting points after transformation from the coordinates of the intersecting points before the transformation mentioned above using the transformation of the coordinates, which the image transformation unit 10 calculated and which is received from the image transformation unit 10. Transformation of coordinates, which the image transformation unit 10 obtains, is expressed, for example, by a transformation expression and its parameters in case transformation can be expressed by any expression, by a transformation table including coordinates, before and after the transformation, of each point of an image, or their combination. What is transferred from the image transformation unit 10 to the intersecting point extraction unit 12 is, transformation data including a transformation expression and its parameters, a transformation table, or their combination, which are mentioned above. Also, in case the relative positions of the charting points in two images after the transformation match, coordinates of an intersecting point obtained from one image will be coordinates of an intersecting point on the other image.

The intersecting point display unit 13 displays a abovementioned predetermined figure representing an intersecting point, at the position corresponding to coordinates, which the intersecting point extraction unit 12 obtained, of an intersecting point in the respective striped pattern images, overlaid on two striped pattern images which the charting diagram display unit 11 displays.

The striped pattern image examination support device 1B of FIG. 4 can be realized by a hardware module for a special purpose, by a computer and a program which controls the computer, or by a combination of a hardware module for a special purpose and a computer and a program which controls the computer.

Next, operation of the striped pattern image examination support device according to this exemplary embodiment will be described in detail with reference to drawings.

Figure 5:
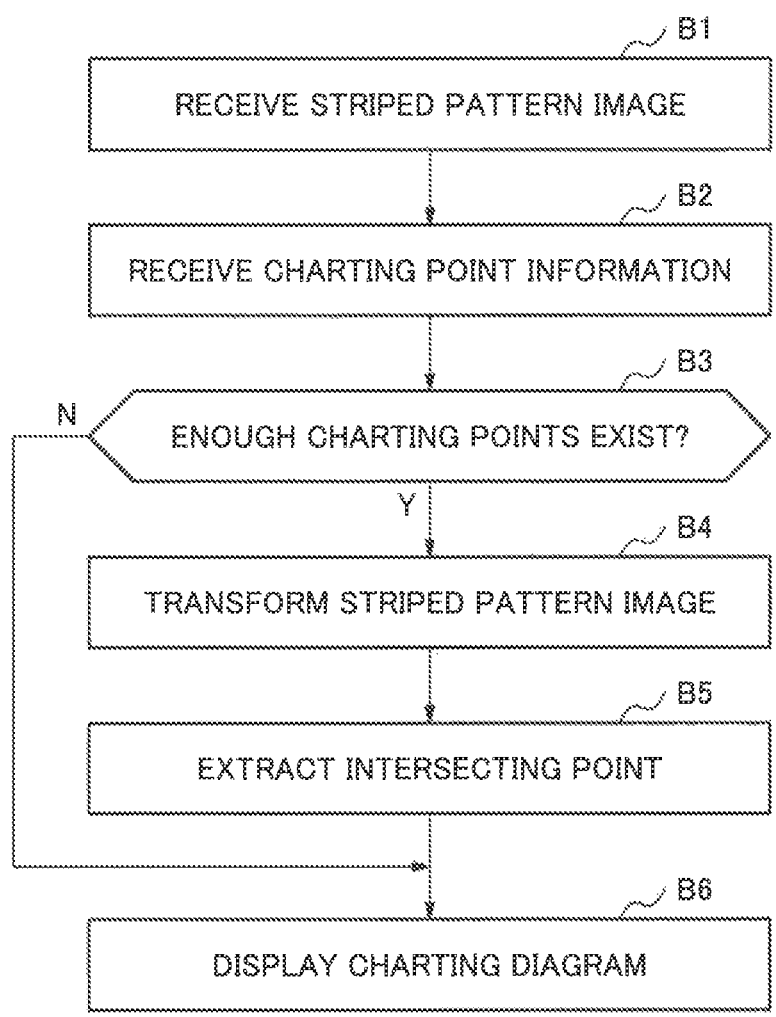
[FIG. 5] A flow chart showing operation of a striped pattern image examination support device in the first exemplary embodiment.

FIG. 5 is a flow chart showing operation of the striped pattern image examination support device according to this exemplary embodiment.

Referring to FIG. 5, first, the image transformation unit 10 of the striped pattern image examination support device 1B receives two striped pattern images (Step B1) and information of charting points of the two striped pattern images (Step B2). The striped pattern image examination support device 1B may receive the striped pattern images from an image input device such as a sensor and a scanner, or may receive the image data which is digitized and stored in advance. The charting point information may be one obtained from the received image by calculation, or may be one obtained through selection or designation by visual observation and manual input.

In case a charting point exists (Step B3, Y), the image transformation unit 10 calculates from the received charting point information 203 transformation which makes relative coordinates of a plurality of charting points match on both of the striped pattern images. The image transformation unit 10 may calculate the transformation which transforms relative coordinates of the charting point of either of the striped pattern images. By the calculated transformation, the image transformation unit 10 transforms the received striped pattern image (Step B4).

The intersecting point extraction unit 12 calculates coordinates of intersecting points of a line segment which connects neighboring charting points and stripes from either of the fingerprint image after the transformation (Step B5).

The charting diagram display unit 11 displays the two striped pattern images after transformation, figures which represent positions of the charting points and figures which specify that they are the charting points on the display device 3. At the same time, the intersecting point display unit 12 displays predetermined figures which represent the intersecting points at the positions corresponding to the coordinates, which the intersecting point extraction unit calculated, of the intersecting points which is on the respective striped pattern images by overlaying them on two striped pattern images after transformation displayed by the charting diagram display unit 11 (Step B6).

By observing the charting diagram and the intersecting points displayed on the display device 3 by the charting diagram display unit 11 and the intersecting point display unit 13, the user performs examination of the striped pattern image.

As stated above, in this exemplary embodiment, there is an effect that user's difference judgment becomes easy, work for identification decreases, and the burden can be reduced. In this exemplary embodiment there further exists an effect that in case quality of a striped pattern image is poor, judgment error such as an error in counting can be decreased.

The first reason is because the striped pattern examination support device of this exemplary embodiment displays a charting point and an intersecting point at the same or nearby relative position on each of the striped pattern images.

In difference judgment of the two striped pattern images, the user used to count the number of stripes that exist between the corresponding charting points by visual observation, and to judge on the basis whether or not the numbers matched. Therefore, in case distortion is large, or in case image quality is poor, for example, in case of a latent fingerprint image, because work for searching charting points or intersecting points or work for modifying positions of the charting points or the intersecting points increased, the burden of the user was heavy. Because image quality of, for example, a latent fingerprint image was poor, it was not possible by image processing to extract intersecting points from the latent fingerprint image automatically with high accuracy.

In case two striped pattern images include a striped pattern deriving from the same target, when the distortion of one striped pattern image against the other striped pattern image is removed completely by transforming the striped pattern images, the striped patterns of both of the striped pattern images after the transformation will overlap one another. Also, even if the distortion of one striped pattern image against the other striped pattern image is not removed completely, when transformation by which relative coordinates of the charting points of the two striped pattern images match is performed, it is expected that striped patterns which exist around the charting points can become similar across the two striped pattern images.

Because the striped pattern examination support device of this exemplary embodiment transforms a striped pattern image by coordinate transformation which makes coordinates of charting points match, the coordinates of the charting points match on the image after the transformation. Also, when two images are the images of the same striped pattern, the striped patterns on both of the images will be similar shape. Accordingly, in case, on a striped pattern image from which the intersecting point was not extracted, and at the position corresponding to the coordinates of the intersecting point which was extracted from the other striped pattern image after the transformation, a figure which indicates the position of the intersecting point is displayed, the actual intersecting point will exist near the figure. Because a charting point or an intersecting point exist at the same or nearby relative position on each of the striped pattern images, the user's difference judgment of the two striped patterns becomes easy, identification work decreases, and the burden is reduced.

Also, the second reason is because, by the striped pattern image examination support device displaying an intersecting point of one striped pattern image on the other striped pattern image, the user can judge whether the numbers of strips between the charting points match without counting the number of the stripes. The striped pattern image examination support device of this exemplary embodiment displays intersecting points extracted from one striped pattern image overlaid on the other striped pattern image. The user can judge whether the numbers of stripes between the charting points match by visual observation to verify whether a corresponding stripe exists around the intersecting point which the striped pattern image examination support device displays. Accordingly, the user can judge, without counting the number of stripes, whether the numbers of stripes which intersect a line segment connecting the charting points match on both of the striped pattern images.

Next, a striped pattern image examination support device according to the second exemplary embodiment of the present invention will be described in detail with reference to drawings.

Figure 6:
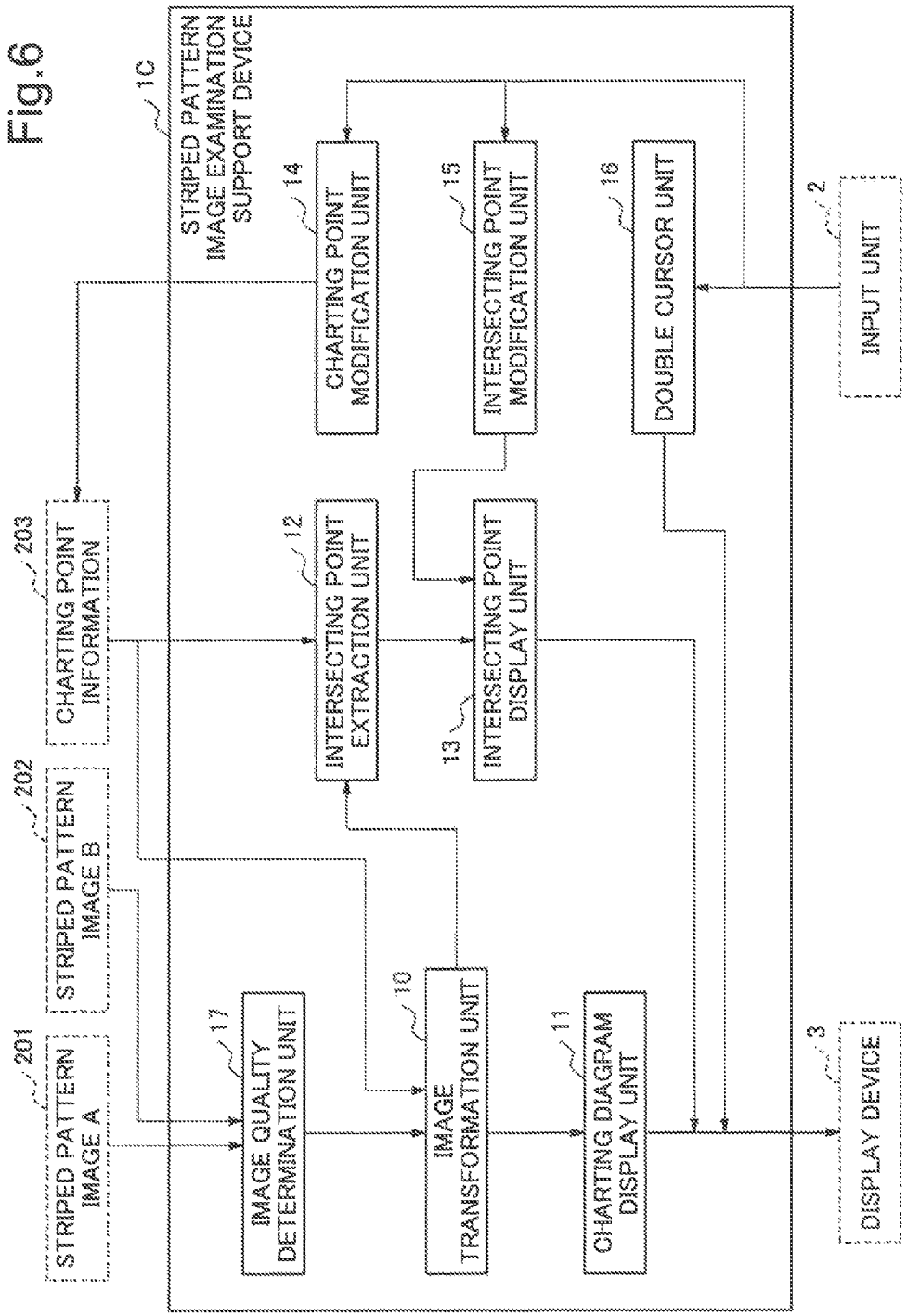
[FIG. 6] A figure showing a striped pattern image examination support device in the second exemplary embodiment.

FIG. 6 is a figure showing a structure of the striped pattern image examination support device according to this exemplary embodiment.

Referring to FIG. 6, the striped pattern image examination support device 1C includes an image transformation unit 10, a charting diagram display unit 11, an intersecting point extraction unit 12, an intersecting point display unit 13, a charting point modification unit 14, an intersecting point modification unit 15, a double cursor unit 16 and an image quality determination unit 17. A display device 3 such as a display and an input unit 2 such as a keyboard, a mouse and a tablet are connected to the striped pattern image examination support device 1C.

Here, description will be made mainly on a point of difference with the first exemplary embodiment of the present invention.

A striped pattern image is, for example, a fingerprint image. Also, the striped pattern image may not be a fingerprint image, but also an image including a striped pattern with other similar shapes such as a palmprint image.

The charting diagram display unit 11 and the charting point modification unit 14 of this exemplary embodiment are the same as the charting diagram display unit 11 and the charting point modification unit 14 of the first exemplary embodiment of the present invention.

The image quality determination unit 17 compares image quality of a striped pattern image A 201 and a striped pattern image B 202 inputted to the striped pattern examination support device 1C and determines superiority or inferiority of the image quality. The image quality determination unit 17 performs determination of superiority or inferiority of the image quality based on a predetermined standard and by existing methods, for example, such as an amount of noise volume, levels of contrast, an amount of broken aerea of extracted stripes, and their combination. The image quality determination unit 17 may perform determination by combining a size of an area in which stripes exist in the image in addition to the standard mentioned above. Also, the image quality determination unit 17 may perform determination by, instead of image processing, letting the user determine superiority or inferiority of the image quality by visual observation.

The image transformation unit 10 of this exemplary embodiment is the same as the image transformation unit 10 of the first exemplary embodiment of the present invention. However, the image transformation unit 10 can decide the striped pattern image to be transformed based on the result of the determination of the image quality determination unit 17. The image transformation unit 10, for example, with the striped pattern image whose image quality is determined to be lower as a standard, performs transformation of the striped pattern image whose image quality is determined to be higher. The image transformation unit 10 may, on the contrary, with the striped pattern image whose image quality is determined to be higher as a standard, perform transformation of the striped pattern image whose image quality is determined to be lower.

The intersecting point extraction unit 12 calculates coordinates of an intersecting point from a striped pattern image whose image quality is determined to be higher as a result of the determination of the image quality determination unit 17. The method of calculation is the same as the first exemplary embodiment. Also, the reason why the intersecting point extraction unit 12 calculates the coordinates of the intersecting points from the striped pattern image whose image quality is determined to be higher is because in case of an image of low image quality such as an image of a latent fingerprint, for example, due to blurring, collapse or noise, there are cases that extracting intersecting points is difficult or cases that extracted intersecting points may include many errors.

The intersecting point display unit 13 is the same as the intersecting point display unit 13 of the first exemplary embodiment. However, in case an intersecting point is modified by the intersecting point modification unit 15 described below, the intersecting point display unit 13 displays a figure representing intersecting point at the position of the intersecting point which the user designated.

The intersecting point modification unit 15 adds or deletes an intersecting point or modifies a position of an intersecting point by the user's operation using the input device 2. Addition or deletion of an intersecting point or modification of a position of an intersecting point is the modification of the intersecting point mentioned above. The intersecting point modification unit 15 performs addition and deletion of the intersecting point simultaneously on both the images. Also, the intersecting point modification unit 15 performs modification of the position of the intersecting points on two images independently.

The double cursor unit 16 shows one cursor of a pointing device at corresponding position on each of the two displayed striped pattern images respectively. The double cursor unit 16 displays, also in case a cursor moves by the user's operation, two cursors at the same relative position on the respective striped pattern images.

Next, operation of the striped pattern image examination support device according to this exemplary embodiment will be described in detail with reference to drawings.

Figure 7:
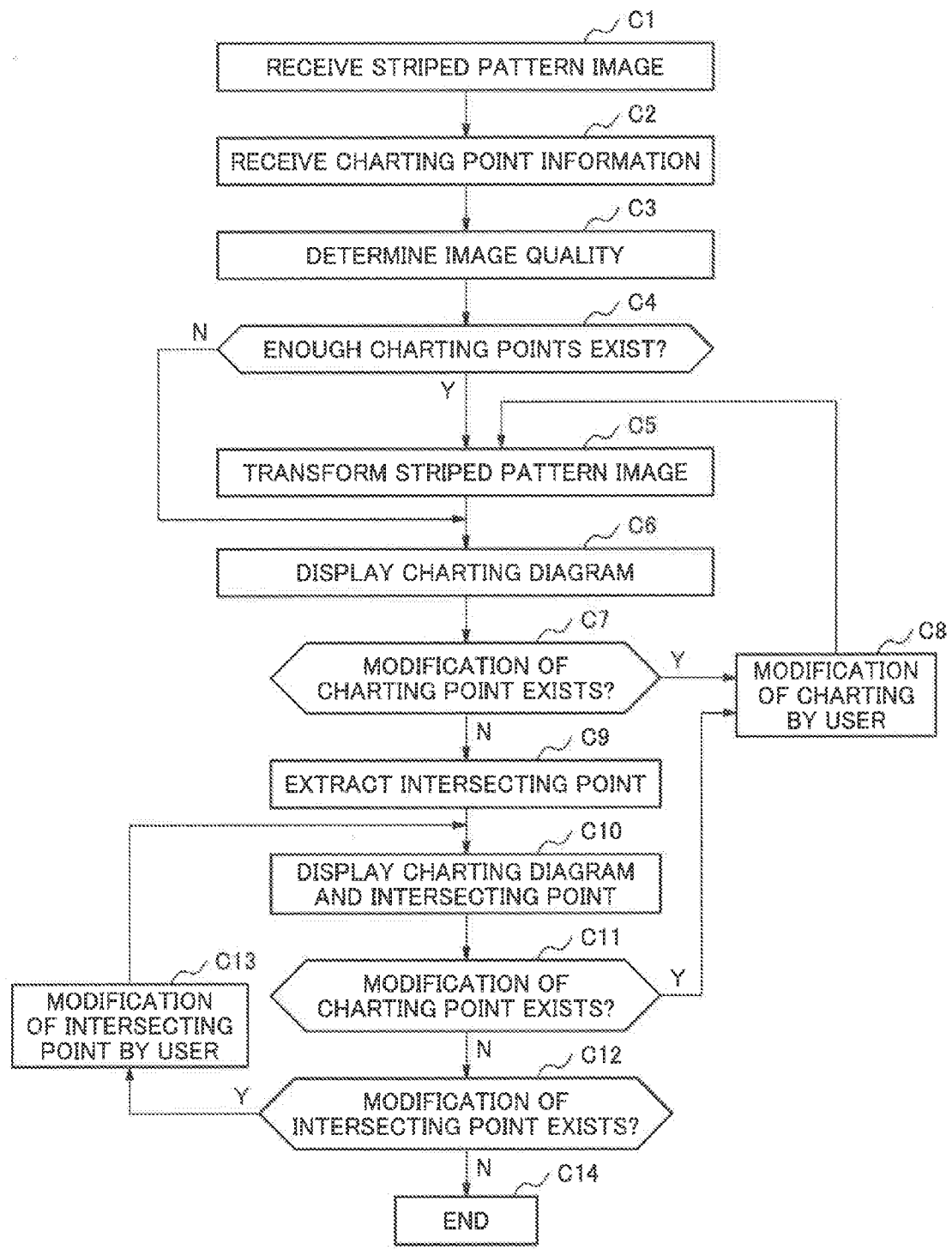
[FIG. 7] A flow chart showing operation of a striped pattern image examination support device in the second exemplary embodiment.

FIG. 7 is a flow chart showing operation of the striped pattern image examination support device according to this exemplary embodiment.

Referring to FIG. 7, first, the image transformation unit 10 of the striped pattern image examination support device 1C receives two striped pattern images (Step C1) and charting point information of the two striped pattern images (Step C2). The striped pattern image examination support device 1C may receive the striped pattern image from an image input device such as a sensor and a scanner, or may receive the image data which is digitized and stored in advance. The charting point information may be one obtained from the received image by calculation, or may be one obtained through selection by visual observation and by manual input.

Next, the image quality determination unit 17 performs determination of superiority or inferiority of image quality of the two inputted striped pattern images (Step C3).

In case enough number of charting points exist on two striped pattern images to perform image transformation (Step C4, Y), the image transformation unit 10 obtains the transformation which makes relative coordinates of a plurality of charting points match from the received charting point information 203. The transformation which the image transformation unit 10 obtains is, for example, transformation which transforms relative coordinates of the charting points of the striped pattern image whose image quality is determined to be higher in Step C3 and makes them match with relative coordinates of the corresponding charting points on the other striped pattern image. The image transformation unit 10 performs transformation of the received striped pattern image by the obtained transformation (Step C5). Whether the number of the charting points is enough or not is judged by a predetermined standard taking the number of parameters of the transformation to be obtained into consideration.

The charting diagram display unit 11 displays a charting diagram including the striped pattern image after the transformation and the charting point information on the display device 3 (Step C6).

The user checks the displayed charting diagram, and in case there is a charting point to be modified (Step C7, Y), modifies the charting point by the charting point modification unit 14 (Step C8). When the modification of the charting point ends, the processing returns to Step 5, the image transformation unit 10 calculates transformation based on information of the charting point after the modification, and performs transformation of the striped pattern image based on the calculated transformation.

In case there are no charting points to be modified (Step C7, N), the intersecting point extraction unit 12 calculates coordinates of an intersecting point of a line segment which connects neighboring charting points and a stripe from the striped pattern image whose image quality is determined to be higher in Step C3 (Step C9).

Next, the charting diagram display unit 11 displays a charting diagram on the display device 3. At the same time, the intersecting point display unit 12 displays predetermined figures which represent intersecting points at positions corresponding to the coordinates of the intersecting points of the two striped pattern images after the transformation displayed by the charting diagram display unit 11 overlaid on the display by the charting diagram display unit 11 (Step C10).

At this point, in case there is a charting point to be modified (Step C11, Y), the user modifies the charting point via the charting point modification unit 14 (Step C8). After the modification, the image transformation unit 10 transforms the striped pattern image (Step C5).

In case there are no charting points to be modified (Step C11, N), and there is an intersecting point whose position is to be modified (Step C12, Y), the user modifies the position of the intersecting point via the intersecting point modification unit 15 (Step C13). When there are no intersecting point whose position is to be modified (Step C12, N), the processing ends (Step C14). The user examines the striped pattern image by observing the charting diagram and the intersecting point displayed on the display device 3. After the processing ends, the user may print the charting diagram by the output device such as a printer which is not illustrated.

While a case was described above where enough number of charting points exist with which the image transformation unit 10 performs image transformation in Step C5, enough number of charting points do not have to exist to perform image transformation at the time the processing starts. In this case (Step C4, N), first, the charting diagram display unit 11 displays striped pattern images which are not transformed by the image transformation unit 10 (Step C6). The user identifies the presence of a charting point of the displayed striped pattern image by visual observation. In case a charting point exists (Step C7, Y), the user adds the charting point by the charting point modification unit 14 (Step C8). The operation of the striped pattern image examination support device 1 after that is the same as the operation in case the charting point information exists.

As stated above, this exemplary embodiment has an effect that it can reduce the amount of modification of intersecting points by the user. The reason is because the image transformation unit 10 extracts intersecting points of a line segment between charting points and a ridge in the striped pattern image of higher image quality based on the result of the determination, which the image quality determination unit 17 performed, of the image quality of the two striped pattern images. It is difficult to perform automatic extraction of the intersecting points with high accuracy from a striped pattern image with low image quality, for example, a latent fingerprint image. Accordingly, when automatic extraction of intersecting points from the striped pattern image of low image quality is performed, work of modification of the positions of the intersecting points by the user increases.

Next, a striped pattern image examination support device according to the third exemplary embodiment of the present invention will be described.

Figure 8:
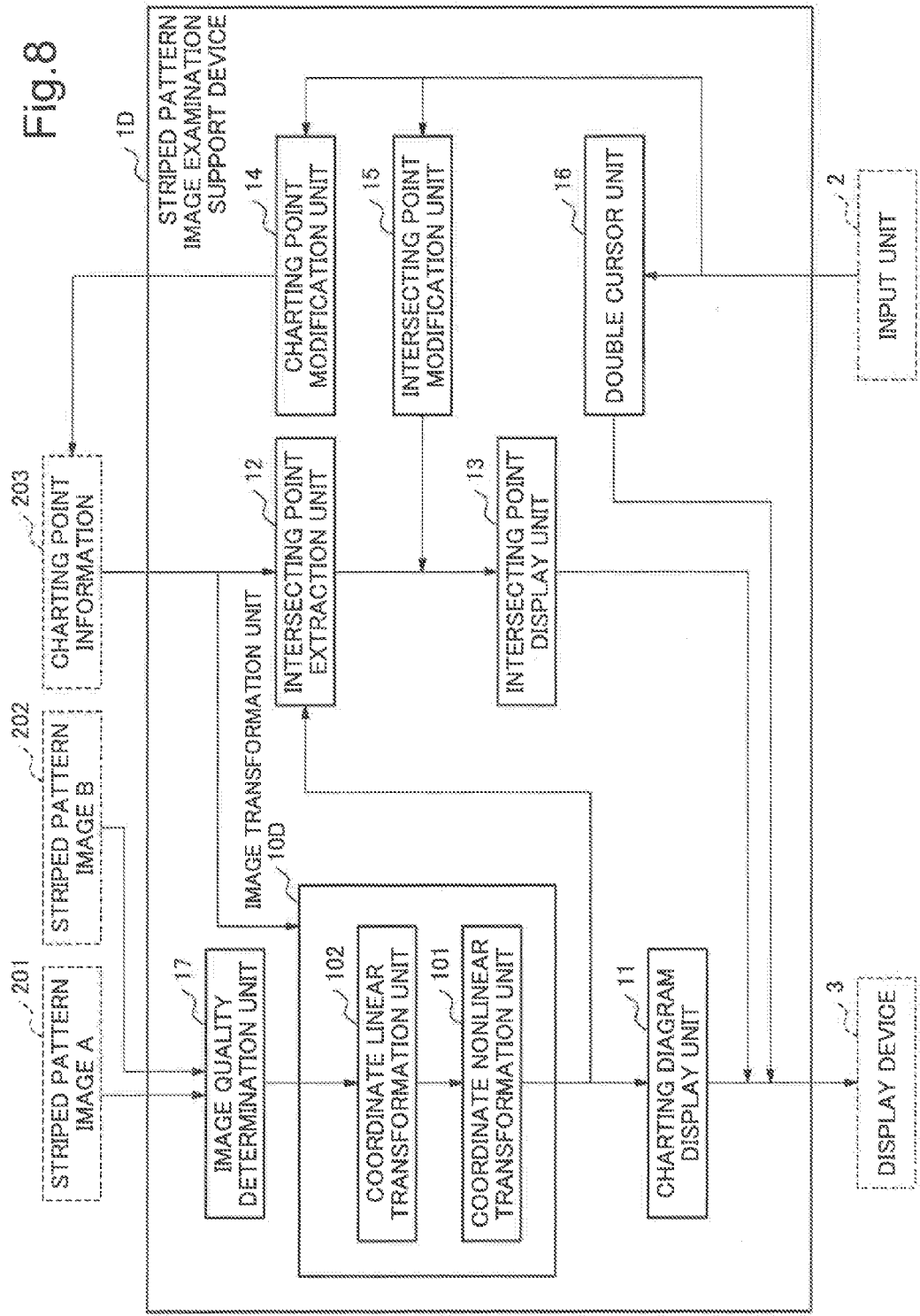
[FIG. 8] A figure showing a striped pattern image examination support device in the third, the fourth, and the fifth exemplary embodiment.

FIG. 8 is a figure showing a structure of the striped pattern image examination support device according to this exemplary embodiment.

Between the structure of the striped pattern image examination support device 1D according to this exemplary embodiment and the structure of the striped pattern image examination support device 1C according to the second exemplary embodiment, structures of the image transformation units is different. The other structure of this exemplary embodiment is the same as the structure of the second exemplary embodiment. Hereinafter, description will be made mainly on a point of difference of this exemplary embodiment and the second exemplary embodiment.

Figure 9:
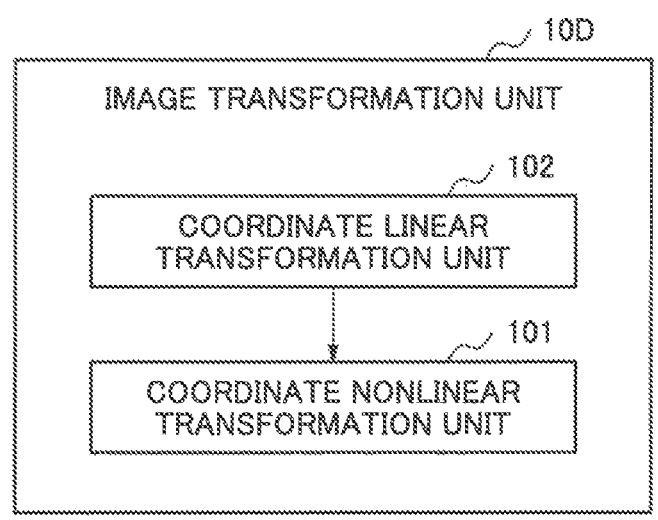
[FIG. 9] A figure showing an image transformation unit in the third, the fourth, the fifth, and the sixth exemplary embodiment.

FIG. 9 is a figure showing a structure of the image transformation unit 10D of this exemplary embodiment.

According to FIG. 9, the image transformation unit 10D includes a coordinate linear transformation unit 102 and a coordinate nonlinear transformation unit 101.

The coordinate linear transformation unit 102 decides parameters of a expression of a transformation of coordinates by linear transformation so that each of charting points included in a image which becomes a target of coordinate transformation nears a charting point included in the other image. Linear transformation is, for example, affine transformation. In case a striped pattern image is, for example, a fingerprint image, especially, a latent fingerprint image, because distortion of the striped pattern image cannot be expressed only by linear transformation, it is not possible to match all the charting points on the two striped pattern images by transforming the striped pattern images based on the linear transformation obtained.

In case the number of charting points is enough, the coordinate linear transformation unit 102 calculates the parameters mentioned above, for example, by the least square method, so that sum of squares of the distances between the charting points may become smallest. The coordinate linear transformation unit 102 transforms coordinates of all the points of one image by the linear transformation which is defined by the calculated parameters.

Also, in case only one charting point exists, the coordinate linear transformation unit 102 performs parallel movement, such that relative positions of the charting point on both the images match, to the image which is a target for transformation. In case two charting points exist, the coordinate linear transformation unit 102 performs parallel movement, such that relative positions of one of the charting point on both the images match, to the image which is a target for transformation. Further, rotation of the image which is the target for transformation is performed so that the directions of the line segments, each of which connect two charting points, on both the images become the same. After rotation is done, expansion or reduction may be performed so that the relative positions of the charting points, whose relative positions were not made to match on both the images by the parallel movement, match.

The coordinate nonlinear transformation unit 101 performs coordinate transformation by the nonlinear transformation mentioned above to the images after the transformation by the coordinate linear transformation unit 102. However, in case the number of charting points is not enough to perform transformation, the coordinate nonlinear transformation unit 101 does not perform the coordinate transformation.

Next, operation of this exemplary embodiment will be described in detail with reference to drawings.

Figure 10:
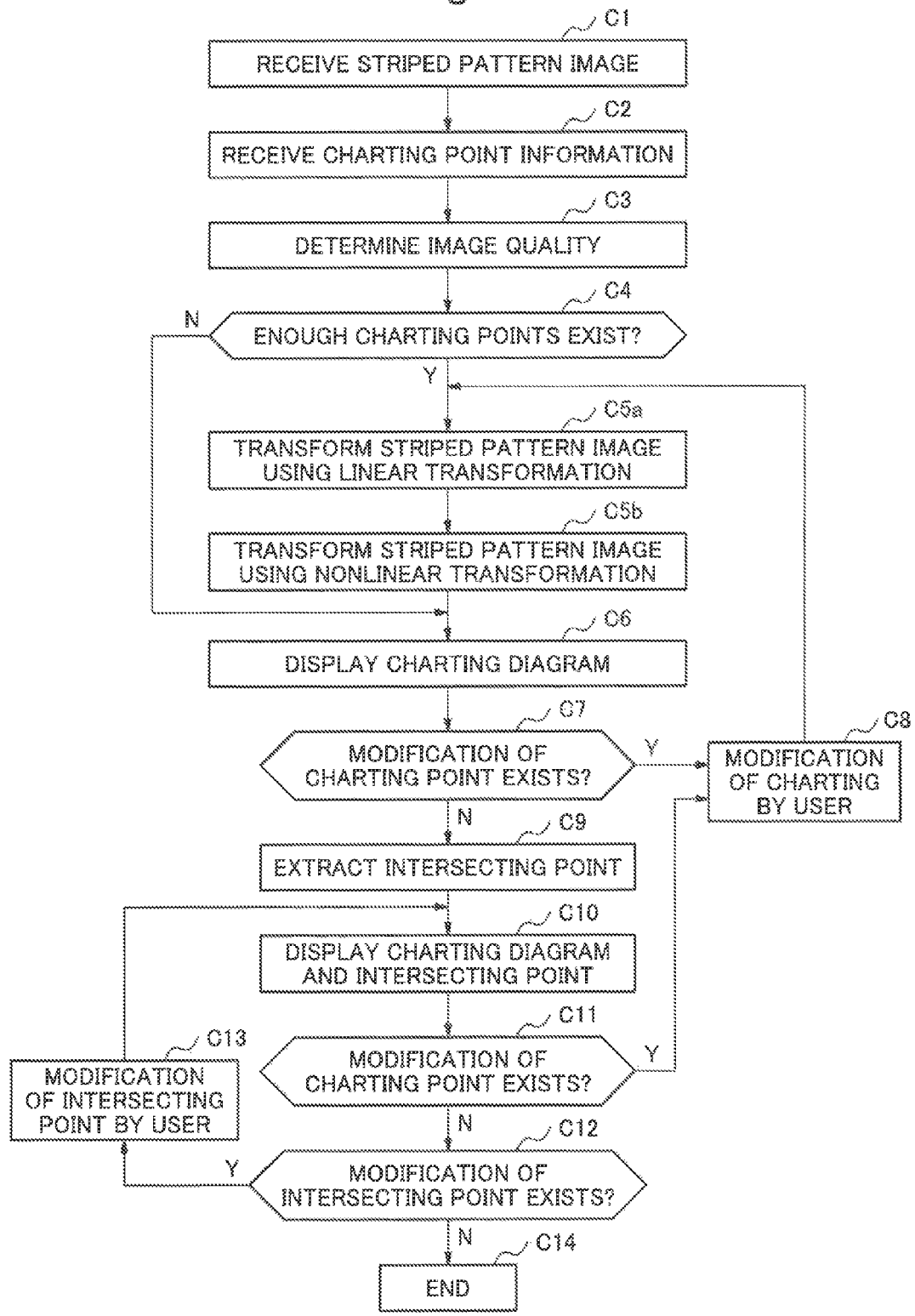
[FIG. 10] A flow chart showing operation of a striped pattern image examination support device in the third, the fourth, and the fifth exemplary embodiment.

FIG. 10 is a flow chart showing operation of this exemplary embodiment.

Referring to FIG. 10, operation of this exemplary embodiment is one in which Step C5 in the operation of the second exemplary embodiment in FIG. 8 is replaced by Step C5*a* and Step C5*b*. Because the other steps are the same as the second exemplary embodiment, their description will be omitted.

Because the operation from Step C1 to Step C4 is the same as the operation of the second exemplary embodiment mentioned above, its description will be omitted. However, as mentioned above, because the image transformation unit 10D performs transformation even in case only one charting point exists, in this exemplary embodiment, the enough number of charting point in order to perform transformation in Step C4 is one.

In case a charting point exists (Step C4, Y), the coordinate linear transformation unit 102 of the image transformation unit 10D first obtains a transformation expression of linear transformation based on the coordinates of the charting point as mentioned above, and transforms coordinates of each pixel of the image by the linear transformation obtained (Step C5*a*).

Next, the coordinate nonlinear transformation unit 101 of the image transformation unit 10D obtains correspondence of coordinates of each point of the image before and after the nonlinear transformation from the coordinates of the charting points as mentioned above, and performs transformation of the coordinates to the images after the linear transformation (Step C5*b*).

Because the operation after Step C7 is the same as the operation of the second exemplary embodiment mentioned above, its description will be omitted.

As stated above, in this exemplary embodiment, there further exists an effect that transformation error of an image is made small. The reason is because the image transformation unit 10D of this exemplary embodiment makes coordinates of charting points close by linear transformation before nonlinear transformation is performed. Error of an amount of movement of each pixel calculated by the nonlinear transformation of this exemplary embodiment is, in case charting points are long way off on the two images and the amount of movement is large, relatively large. However, according to this exemplary embodiment, because the amount of movement of the charting points at the time of the nonlinear transformation can be made small by performing the linear transformation before performing the nonlinear transformation, the error of the amount of movement of each pixel by the nonlinear transformation becomes small.

Next, a striped pattern image examination support device according to the fourth exemplary embodiment of the present invention will be described.

FIG. 8 is a figure showing a structure of the striped pattern image examination support device according to this exemplary embodiment. FIG. 8 is a figure illustrating the structure of the third exemplary embodiment and, at the same time, is also a figure illustrating the structure of this exemplary embodiment. The structure of the striped pattern image examination support device according to this exemplary embodiment is the same as the structure of the striped pattern image examination support device according to the third exemplary embodiment.

Here, description will be made mainly on a point of difference of this exemplary embodiment and the third exemplary embodiment.

Although the other structure of this exemplary embodiment is the same as the structure of the third exemplary embodiment, between this exemplary embodiment and the third exemplary embodiment, types of transformation, which the coordinate linear transformation unit 102 of the image transformation unit 10D performs, are different. Hereinafter, description will be made mainly on a point of difference of this exemplary embodiment and the third exemplary embodiment.

Linear transformation performed in this exemplary embodiment is Helmert (Helmert) transformation. Helmert transformation is a method adopted widely in the processing of a drawing such as a map, and the image after transformation is guaranteed to be a similar figure, Helmert transformation is also called similarity transformation. In the Helmert transformation, inverse transformation, which calculates coordinates before transformation from coordinates after transformation, is also easy.

A transformation expression of the Helmert transformation can be calculated from coordinates of a plurality of charting points. Calculation of the transformation expression is performed by, for example, calculating parameters of the transformation expression by the least square method so that sum of squares of the distances between the point which is specified by the coordinates which are the coordinates of a charting point of one image transformed by the transformation expression and the corresponding charting point on the other image may become smallest.

The coordinate linear transformation unit 102 of the image transformation unit 10D first calculates a transformation expression of Helmert expression from the coordinates of the charting point obtained.

Next, the coordinate linear transformation unit 102 of the image transformation unit 10D transforms, by the transformation expression of the Helmert transformation obtained, coordinates of all the points of one striped pattern image.

The coordinate nonlinear transformation unit 101 performs coordinate transformation by the nonlinear transformation mentioned above to the image after the transformation by the coordinate linear transformation unit 102.

Because the operation of this exemplary embodiment is the same as the operation of the third exemplary embodiment shown in FIG. 10, its description will be omitted.

As stated above, in this exemplary embodiment, there is an effect that calculation for calculating a transformation expression of linear transformation becomes easy.

The reason is because the linear transformation which the striped pattern image examination support device of this exemplary embodiment performs is the Helmert transformation for which a smaller number of parameters are calculated than affine transformation and so on. Accordingly, the striped pattern image examination support device of this exemplary embodiment can calculate a transformation expression of linear transformation by easier calculation.

Next, a striped pattern image examination support device according to the fifth exemplary embodiment of the present invention will be described.

FIG. 8 is a figure showing a structure of the striped pattern image examination support device according to this exemplary embodiment. Here, FIG. 8 is a figure illustrating the structure of the third and the fourth exemplary embodiment and, at the same time, is also a figure illustrating the structure of this exemplary embodiment. The structure of the striped pattern image examination support device according to this exemplary embodiment is the same as the structure of the striped pattern image examination support device according to the third and the fourth exemplary embodiment.

Between this exemplary embodiment and the fourth exemplary embodiment, types of transformation, which the coordinate linear transformation unit 102 of the image transformation unit 10D performs, are different. Hereinafter, description will be made mainly on a point of difference of this exemplary embodiment and the fourth exemplary embodiment.

The coordinate linear transformation unit 102 of this exemplary embodiment performs the Helmert transformation mentioned above, expansion or contraction transformation to a vertical direction (X-direction) and a horizontal direction (Y-direction) and skew (skew; slanting distortion) correction successively.

The coordinate linear transformation unit 102 first obtains a transformation expression of the Helmert transformation from coordinates of charting points obtained like the fourth embodiment for a striped pattern image after coordinate linear transformation and performs the Helmert transformation by the transformation expression obtained.

The coordinate linear transformation unit 102 next obtains a transformation expression of an expansion or contraction transformation to a vertical direction and a horizontal direction for the striped pattern image after the Helmert transformation is performed, and performs the expansion or contraction transformation to a vertical direction and a horizontal direction by the transformation expression obtained.

The transformation expression of the expansion or contraction transformation to a vertical direction and a horizontal direction is as follows. Hx and by of the following expressions are the degrees of expansion or contraction of an X-direction and a Y-direction respectively.

$$Qx(k)=Px(k)+hx*(Px(k)-PxC)$$

$$Qy(k)=Py(k)+hy*(Py(k)-PyC)$$

Qx(k) and Qy(k) of the expressions described above are an X-coordinate and a Y-coordinate of the k-th charting point after the transformation respectively. Also, Px(k) and Py(k) are an X-coordinate and a Y-coordinate of the k-th charting point before the transformation respectively. PxC and PyC are an X-coordinate and a Y-coordinate of a center of gravity of all the charting points before the transformation respectively.

The coordinate linear transformation unit 102 first calculates hx and hy from the obtained coordinate values of the charting points after the Helmert transformation. Specifically, the coordinate linear transformation unit 102 calculates hx and hy in an approximate way from the following 2n expressions by an existing method, for example, the least square method. Here, n is a number of the sets of the charting points. Also, Tx(k) and Ty(k) are an X-coordinate and a Y-coordinate of the charting point on a target image respectively. The target image is, among the two striped pattern images, the image for which transformation is not performed.

$$(Tx(1) - TxC) = hx^*(Px(1) - PxC)$$
$$\vdots$$
$$(Tx(n) - TxC) = hx^*(Px(n) - PxC)$$
$$(Ty(1) - TyC) = hy^*(Py(1) - PyC)$$
$$\vdots$$
$$(Ty(n) - TyC) = hy^*(Px(n) - PyC)$$

The coordinate linear transformation unit 102 calculates hx and hy and performs transformation of coordinates according to the transformation expression of the expansion or contraction transformation to a vertical direction and a horizontal direction.

Next, the coordinate linear transformation unit 102 obtains a transformation expression of skew correction from the coordinates of the charting points on the striped pattern image after the expansion or contraction transformation to a vertical direction and a horizontal direction, and performs the skew correction according to the transformation expression.

The transformation expression of the skew correction is as follows. In the following expressions, $(Qx(k), Qy(k))$ are coordinates of the k-th charting point after the expansion or contraction transformation to a vertical direction and a horizontal direction. Also, $(Rx(k), Ry(k))$ are coordinates of the charting point after the skew correction. Vx and vy are skew correction coefficients of an X-direction and a Y-direction respectively.

$$Rx(k)=Qx(k)+vx^*Qy(k)$$
$$Ry(k)=Qy(k)+vy^*Qx(k)$$

The coordinate linear transformation unit 102 first calculates vx and vy from the obtained coordinate values of the charting points after the expansion or contraction transformation to a vertical direction and a horizontal direction. Specifically, calculation of vx and vy in an approximate way from the following 2n expressions is performed by an existing method, for example, the least square method. Here, n is a number of the sets of the charting points. Also, Tx(k) and Ty(k) are an X-coordinate and a Y-coordinate of the charting point on the target image respectively.

$$Qy(1) - Ty(1) = vx^*Qy(1)$$
$$\vdots$$
$$Qy(n) - Ty(n) = vx^*Qy(n)$$
$$Qx(1) - Ty(1) = vy^*Qx(1)$$
$$\vdots$$
$$Qx(n) - Ty(n) = vy^*Qx(n)$$

The coordinate linear transformation unit 102 calculates vx and vy and performs transformation of coordinates according to the transformation expression of the skew correction.

The coordinate nonlinear transformation unit 101 performs coordinate transformation by the nonlinear transformation mentioned above to the image after the transformation by the coordinate linear transformation unit 102.

Because the operation of this exemplary embodiment is the same as the operation of the third and the fourth exemplary embodiment shown in FIG. 10, its description will be omitted.

As stated above, in this exemplary embodiment, there further exists an effect that a difference in positions of the charting points after the linear transformation becomes smaller.

The reason is because the striped pattern image examination support device of this exemplary embodiment performs the expansion or contraction transformation to a vertical direction and a horizontal direction and the skew correction after the Helmert transformation is performed. In case the coordinate linear transformation unit 102 performs, after performing the Helmert transformation, the expansion or contraction transformation to a vertical direction and a horizontal direction and the skew correction, the difference in the relative positions of the charting points after the transformation becomes small compared with a case when the coordinate linear transformation unit 102 performs the linear transformation only by the Helmert transformation.

Next, a striped pattern image examination support device according to the sixth exemplary embodiment of the present invention will be described.

Figure 11:
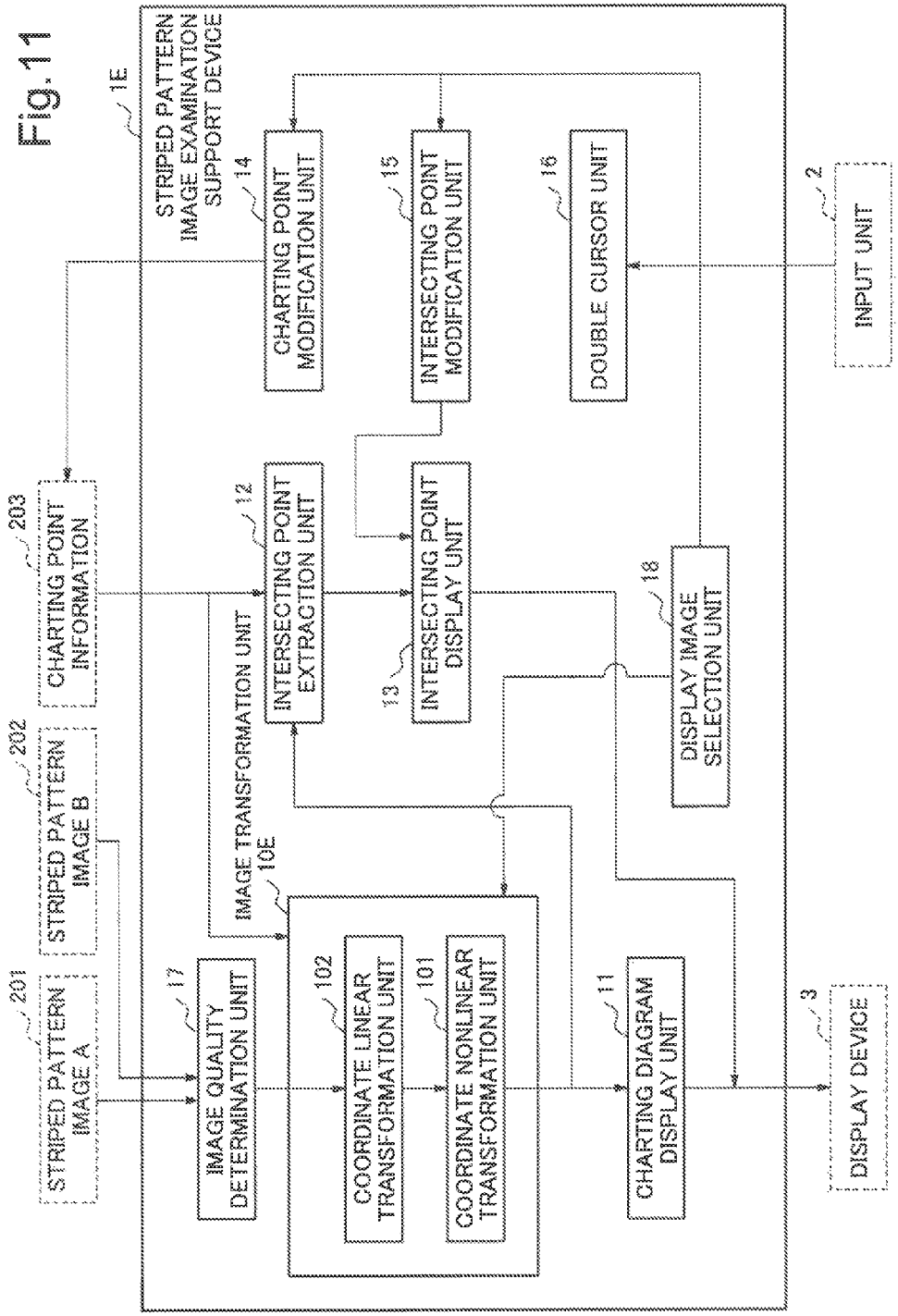
[FIG. 11] A figure showing a striped pattern image examination support device in the sixth exemplary embodiment.

FIG. 11 is a figure showing a structure of the striped pattern image examination support device 1E according to this exemplary embodiment.

The structure of this exemplary embodiment is a structure in which a display image selection unit 18 is added to the structure of the fifth exemplary embodiment shown in FIG. 8. Hereinafter, description will be made mainly on a point of difference of this exemplary embodiment and the fifth exemplary embodiment.

The display image selection unit 18 selects, by the user's operation via the input unit 2, which stage of transformation among transformations which the image transformation unit 10 performs, where the charting diagram display unit 11 displays the charting diagram based on the striped pattern image after the selected stage of transformation. Based on the selection by the display image selection unit 18, the charting diagram display unit 11 displays a charting diagram based on one of, for example, a striped pattern image before transformation, a striped pattern image for which only linear transformation is performed, or a striped pattern image for which linear transformation and nonlinear transformation are performed. Also, the display image selection unit 18 may be made to be able to select a striped pattern image at end of either transformation, for example, Helmert transformation, expansion or contraction transformation to a vertical direction and a horizontal direction, or skew correction, which the coordinate linear transformation unit 101 performs successively.

The display image selection unit 18 outputs transformation selection data representing until which stage the transformation is performed to the striped pattern image on which the charting diagram, which the charting diagram display unit 11 displays, is based.

An image transformation unit 10E outputs the transformation selection data received from the display image selection unit 18 and the striped pattern image for which transformation is performed until the stage that the transformation selection data represents. The image transformation unit 10E calculates transformation of all the stages first and generates transformation data which represents the transformation until the stage that the transformation selection data represents. The image transformation unit 10E may calculate the transformation until the stage that the transformation selection data received from the display image selection unit 18 represents. Calculating of this transformation is, as mentioned above, to calculate a transformation expression or a table which represents the transformation. The image transformation unit 10E outputs transformation data which represents the transformation until the stage that the received transformation selection data represents, and a striped pattern image for which transformation is performed until the stage of the transformation. Also, charting point information which the image transformation unit 10E outputs is one for which transformation is performed until the stage that the received transformation selection data represents to coordinates of a charting point.

The charting diagram display unit 11 displays a charting diagram based on the charting point information after the transformation or a striped pattern image after the transformation which is received from the image transformation unit 10E.

Also, the intersecting point display unit 12 may display coordinates of intersecting points of line segments each of which connects between two charting points and ridges at the stage of the transformation selected by the display image selection unit 18. In that case, the intersecting point extraction unit 12 performs transformation of intersecting point coordinates extracted from the striped pattern image before transformation based on the transformation data which is received from the image transformation unit 10. The intersecting point display unit 12 displays the intersecting point overlaid on the charting diagram.

Next, operation of this exemplary embodiment will be described in detail with reference to drawings.

Figure 12:
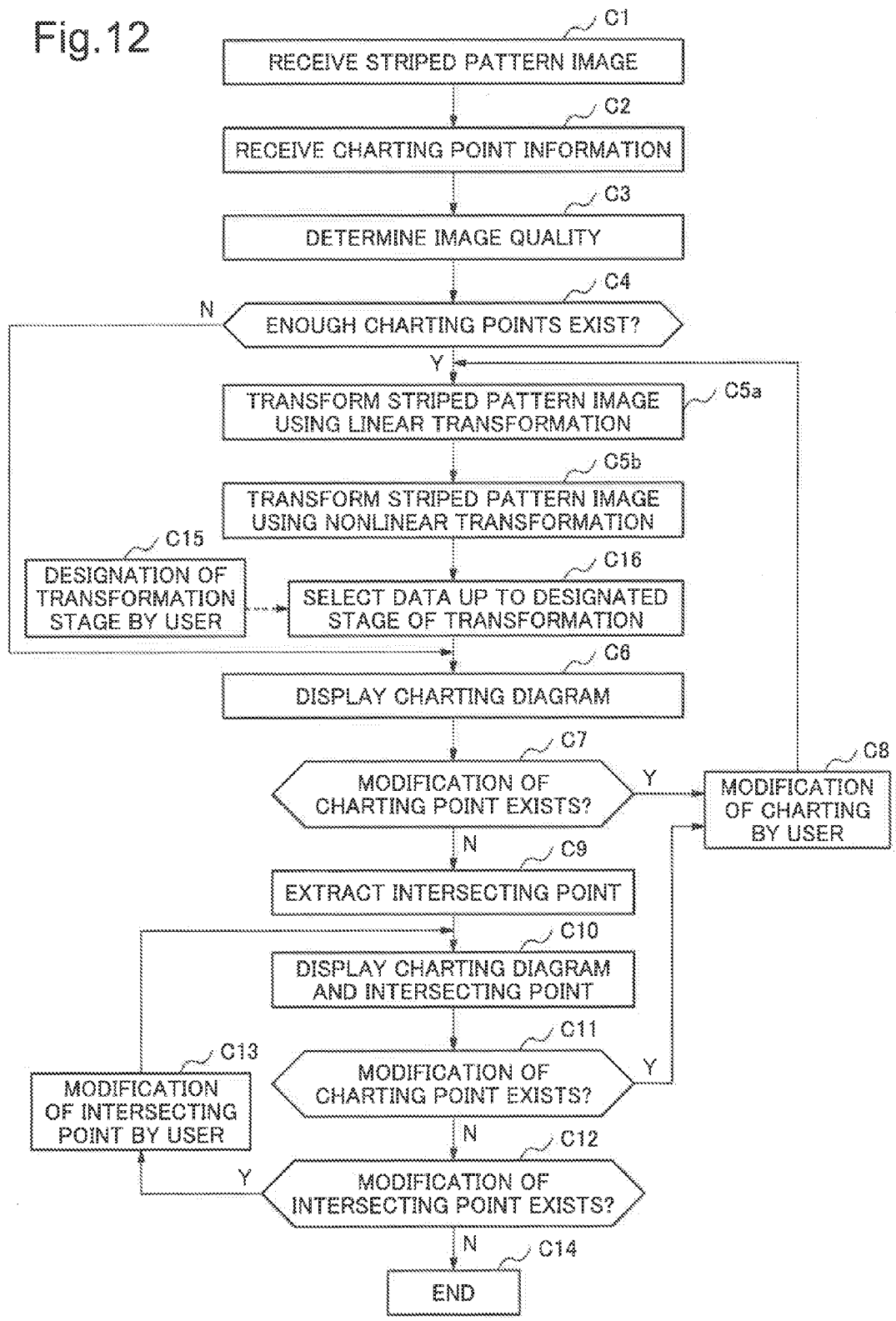
[FIG. 12] A flow chart showing operation of a striped pattern image examination support device in the sixth exemplary embodiment.

FIG. 12 is a flow chart showing operation of the striped pattern image examination support device according to this exemplary embodiment. Steps C1 to C5b and Step C6 to Step C14 are the same as the flow chart of the fifth exemplary embodiment shown in FIG. 10. Here, description will be made mainly on a point of difference with the fifth exemplary embodiment.

According to this exemplary embodiment, the user designates a stage until which transformation is performed to the striped pattern image to display as a charting diagram. The image transformation unit 10E receives the transformation selection data designated by the user which represents the stage of the transformation of the striped pattern image which is displayed as the charting diagram (Step C15).

The image transformation unit 10E first calculates linear transformation by the coordinate linear transformation unit 102 (Step C5a) and calculates nonlinear transformation by the coordinate nonlinear transformation unit 101 (Step C5b). The image transformation unit 10E then generates the transformation data which represents the transformation until the stage that the user designated in Step C15. The image transformation unit 10E performs transformation of the striped pattern image and transformation of coordinates of the charting points based on the generated transformation data. The image transformation unit 10E sends the generated transformation data, information of the charting points at the stage of the transformation which the user designated and the transformed striped pattern image to the charting diagram display unit 11 (Step C16).

The charting diagram display unit 11 displays the charting diagram at the stage of the transformation designated by the user (Step C6).

Because the operation after that is the same as the operation of the striped pattern image examination support device according to the fifth exemplary embodiment shown in FIG. 10, its description will be omitted.

As stated above, in this exemplary embodiment, there is an effect that, depending on the striped pattern image which becomes a target, the user can perform examination by the image in the state that examination is easiest to perform in the process of the transformation The reason is because the user can select how far the transformation is performed to the striped pattern image to display as the charting diagram.

Next, an example of the present invention will be described with reference to drawings of the sample fingerprint images.

Figure 13:
[FIG. 13] A figure showing an example of a latent fingerprint image in the embodiment.
Figure 14:
[FIG. 14] A figure showing an example of an impression fingerprint image in the embodiment.

This example is an example which displayed a charting diagram and an intersecting point of a latent fingerprint of FIG. 13 and an impression fingerprint of FIG. 14 by the fingerprint examination support device according to the fifth exemplary embodiment shown in FIG. 8.

FIG. 13 is an example of a latent fingerprint used in this example. FIG. 14 is an example of an impression fingerprint which forms a pair with the latent fingerprint of FIG. 13. A latent fingerprint is, for example, a fingerprint left at a criminal scene and so on, and the image quality is usually low. An impression fingerprint is a fingerprint collected for registration purposes, and image quality is usually higher than a latent fingerprint. Although fingerprints as a target of difference judgment may be among latent fingerprints, or among impression fingerprints, usually, often the case is between a latent fingerprint and an impression fingerprint.

Sample fingerprint images such as FIG. 13 and FIG. 14 are digitized fingerprint images read by a sensor or a scanner. Such sample fingerprint images are digitized at a resolution of 500 dpi following ANSI/NIST-ITL-1-2000 Data Format for the Interchange of Fingerprint, Facial, & Scar Mark & Tattoo (SMT) Information standardized by American NIST (National Institute of Standards and Technology). Further, this standard document is disclosed by NIST Special Publication 500-245 of ANSI/NIST-ITL 1-2000 Revision of ANSI/NIST-CSL1-1993 & ANSI/NIST-ITL 1a-1997 (as of Mar. 11, 2009). URL of this document is <ftp://sequoyah.nist.gov/pub/nist_internal_reports/sp500-245-a16.pdf>.

Figure 15:
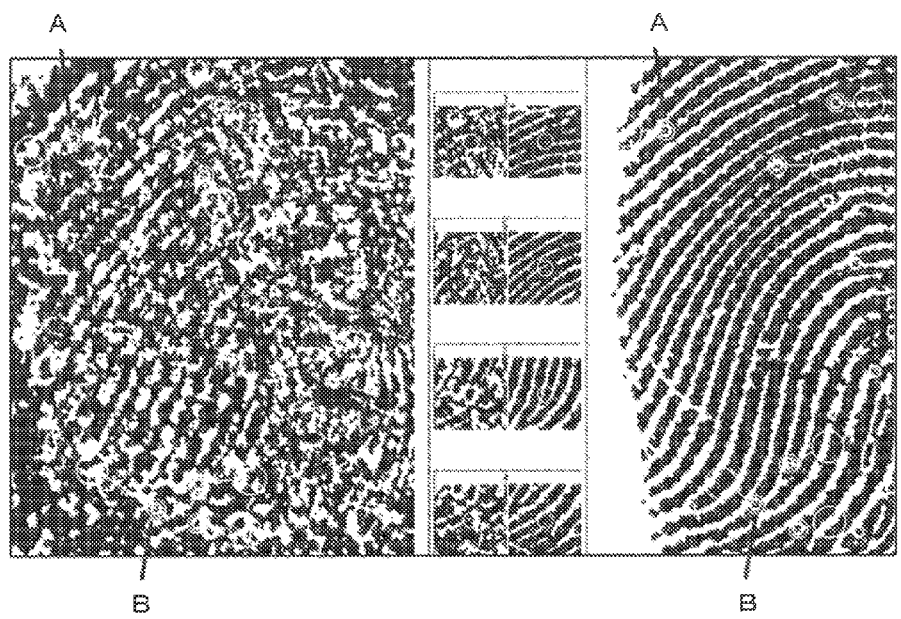
[FIG. 15] An example of display in which a striped pattern image examination support device in the embodiment performed side by side display of a latent fingerprint and an impression fingerprint.

FIG. 15 is an example of side by side display of the fingerprint image of FIG. 13 and FIG. 14 displayed on a screen of the display device 3. The user performs addition or deletion of a charting point or modification of a position by watching a display such as FIG. 15. Points indicated by A and B of FIG. 15 are noted charting points. Also similarly in other drawings, points indicated by A and B are noted charting points.

First, the striped pattern image examination device 1D receives fingerprint images shown in FIG. 13 and FIG. 14.

Next, the image quality determination unit 17 determines image quality of the fingerprint images of FIG. 13 and FIG. 14.

The image transformation units 10D obtains, from the fingerprint images and the charting point information of FIG. 13 and FIG. 14, a coordinate transformation expression and performs coordinate linear transformation by the coordinate linear transformation unit 102, and further, creates a coordinate transformation table and performs coordinate nonlinear transformation by the coordinate nonlinear transformation unit 101. The image transformation unit 10D performs transformation to the fingerprint image whose image quality is determined to be higher by the image quality determination unit 17. In the example of the fingerprint images of FIG. 13 and FIG. 14, the image transformation unit 10D performs transformation to the image of the impression fingerprint of FIG. 14.

The intersecting point extraction unit 12 extracts intersecting points from the fingerprint image of FIG. 14, whose image quality is determined to be higher by the image quality determination unit 17. The intersecting point extraction unit 12 first performs thinning of ridges of the fingerprint image, and then, obtains coordinates of intersecting points of line segments each of which connects two charting points (point A and point B of FIG. 15) and a skeleton. In the example of FIG. 13 and FIG. 14, part of black stripes is a ridge.

Next, the intersecting point extraction unit 12 calculates coordinates of points in FIG. 13, each of which corresponds to a intersecting point extracted from FIG. 14. Specifically, by proportional calculation, the intersecting point extraction unit 12 calculates the distance between two charting points in FIG. 14 and the distance between one charting point and each of the intersecting points, and obtains coordinates of points which are on the line segments each of which connects corresponding two charting points in FIG. 13 and each of which corresponds to a intersecting point extracted from FIG. 14.

Figure 16:
[FIG. 16] An example of an impression fingerprint before thinning is performed.
Figure 17:
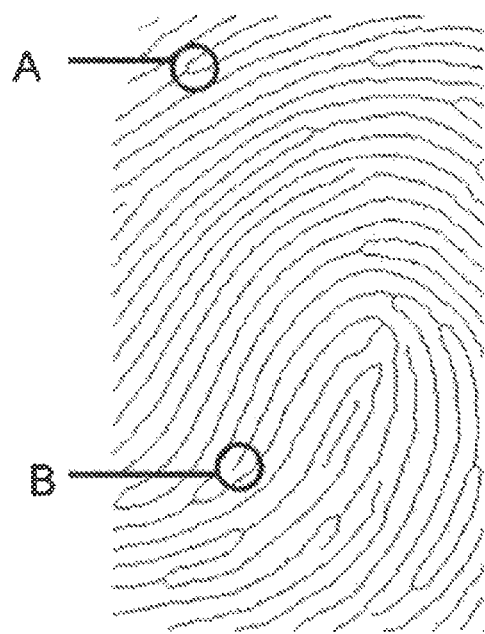
[FIG. 17] An example of a skeleton image as a result of thinning being performed to an impression fingerprint.

FIG. 17 is an example of display on a screen of a skeleton image which is a result of thinning performed to the image of FIG. 14 in the intersecting point extraction unit 2 or other parts. FIG. 16 is an example of display on a screen of an image which is a range corresponding to FIG. 17 cut out from FIG. 14. In FIG. 16 and FIG. 17, point A and point B which are charting points are displayed.

Figure 18:
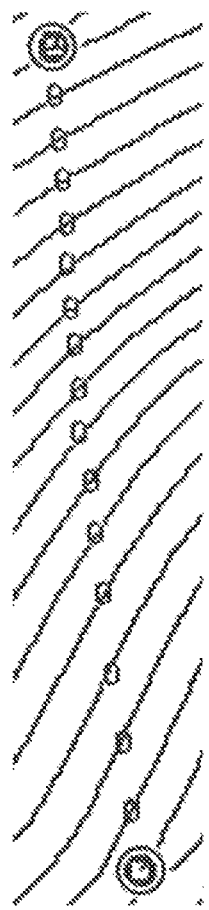
[FIG. 18] An example of a skeleton image and intersecting points of a line segment which connects two charting points extracted from the skeleton image and a skeleton.

FIG. 18 is a displayed image of a figure representing intersecting points displayed on the skeleton image of FIG. 17 at positions corresponding to the intersecting points which are extracted between the charting points to which a circle mark is attached on the image of FIG. 17, which is enlarged around the intersecting points. In FIG. 18, ovals (fifteen displays of "0") are the figures representing intersecting points.

The intersecting point display unit 13 displays the obtained intersecting point overlaid on the fingerprint image and displays it on the display device.

Figure 19:
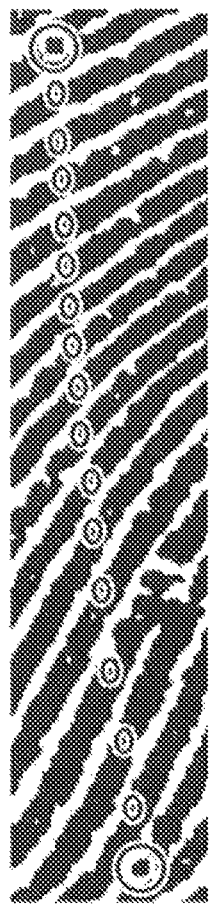

FIG. 19 is an image in which intersecting points are overlaid and displayed on the image of the impression fingerprint of FIG. 14 and the area corresponding to FIG. 18 is enlarged.

Figure 20:
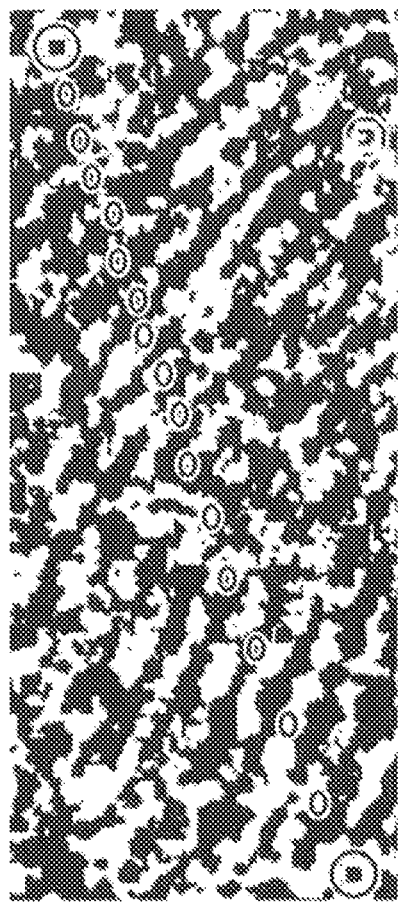

FIG. 20 is an image in which figures (in this example, ovals, that is, fifteen displays of "0"), each of which represents an intersecting point, are displayed at points in FIG. 13, each of which corresponds to an intersecting point displayed in FIG. 19, and in which an area of the latent fingerprint image of FIG. 13 around the area corresponding to FIG. 19 is enlarged.

The user watches the fingerprint image such as FIG. 20 in which an intersecting point is overlaid and displayed, and modifies the intersecting points if necessary.

Figure 21:
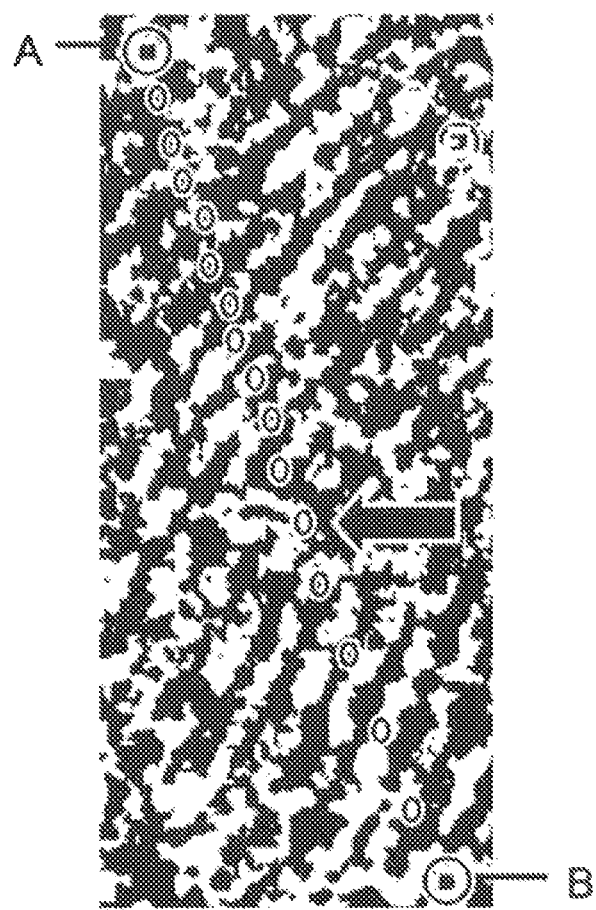

FIG. 21 is a figure showing a position of an intersecting point before modification is performed by the user. Because the intersecting points displayed in FIG. 21 do not rest on the ridges, the user modifies the positions of the intersecting points so that the intersecting points may rest on the ridges.

Figure 22:
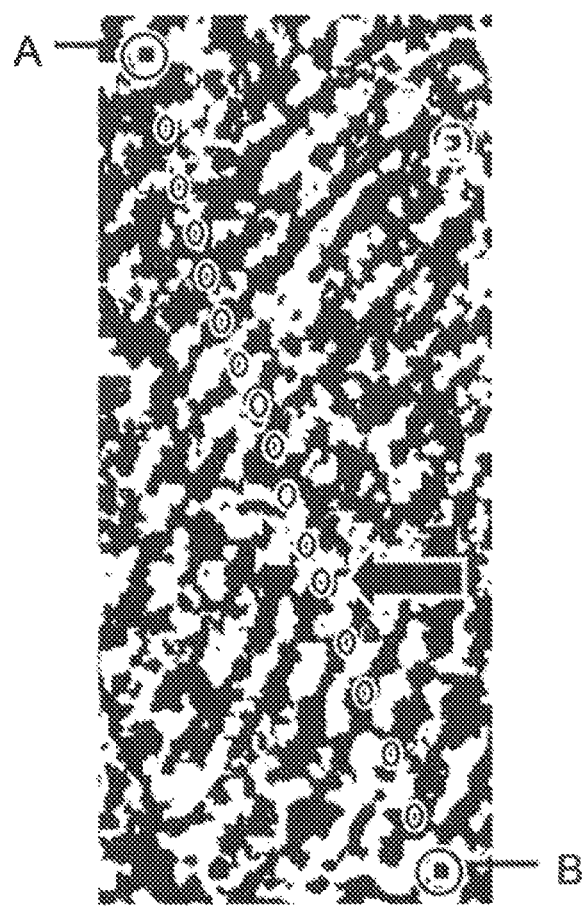

FIG. 22 is a figure showing a result in which the user modified the position of the intersecting point included in FIG. 21. As a result of the modification of the position by the user, the intersecting point indicated by an arrow in FIG. 21 has moved to the position of the intersecting point which an arrow of FIG. 22 indicates. Hereinafter, an arrow in a drawing represents a noted intersecting point.

The striped pattern examination support device 1D overlays charting points and figures representing intersecting points on the two fingerprint images, and displays the two fingerprint images side by side on the display device.

Figure 23:
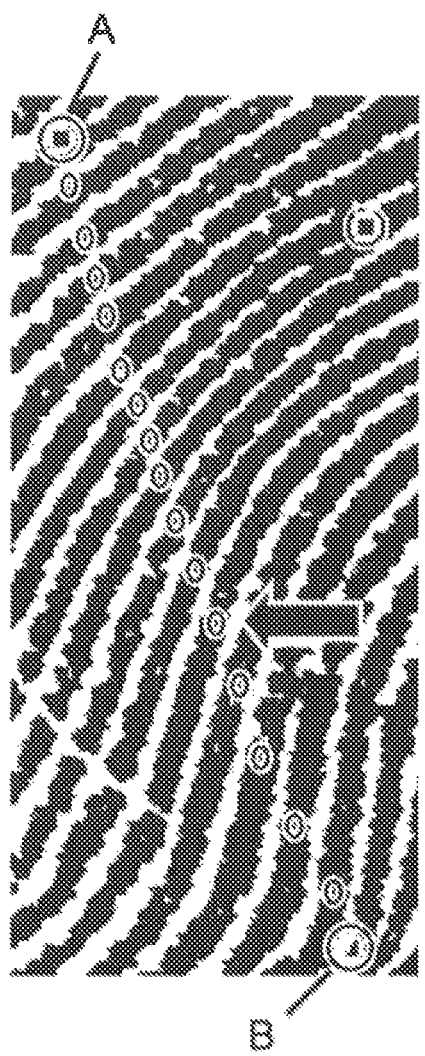

FIG. 23 is a figure of an enlarged area of the impression fingerprint displayed by the striped pattern examination support device 1D on the display device, in which a charting point or an intersecting point shown in FIG. 21 and FIG. 22 exist. The intersecting point on the impression fingerprint corresponding to the intersecting points shown in FIG. 21 and FIG. 22 is the intersecting point indicated by the arrow in FIG. 23.

Next, an effect of this example will be described with reference to drawings.

Figure 24:
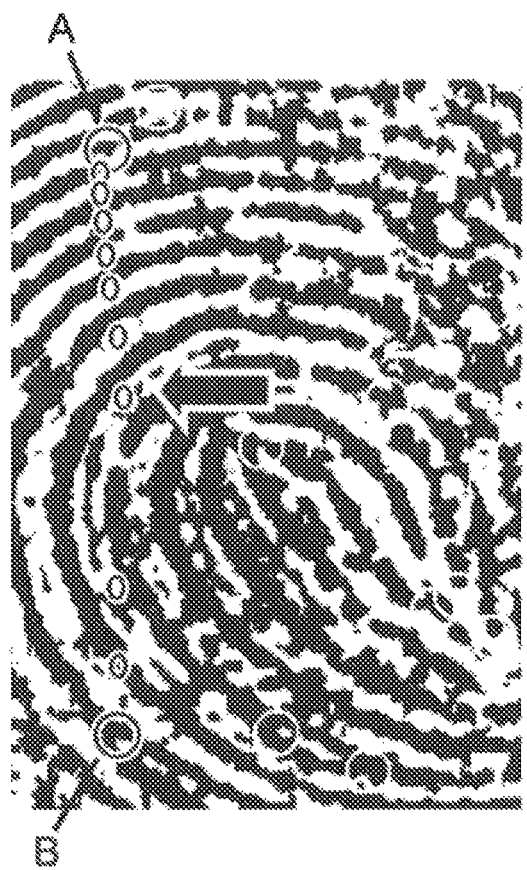
Figure 25:
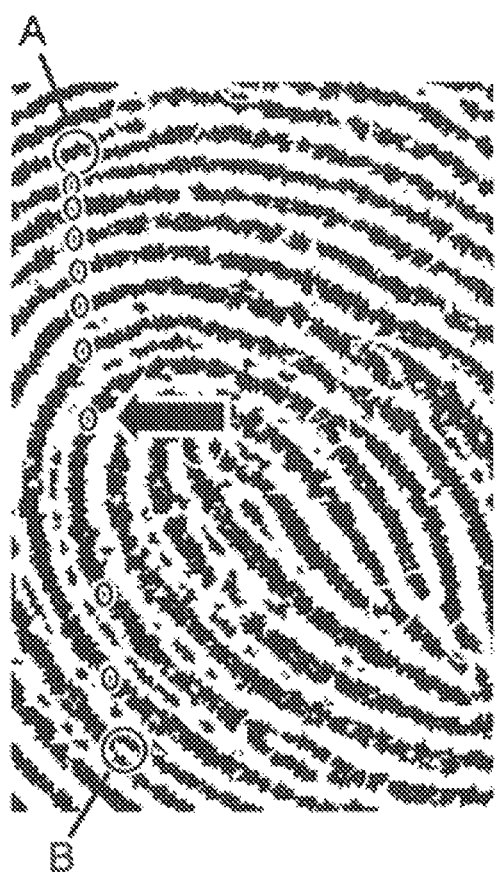

FIG. 24 and FIG. 25 are a latent fingerprint and an impression fingerprint for which only transformation by the linear transformation is performed, in each of which charting points and extracted intersecting points are overlaid and displayed. These latent fingerprint and impression fingerprint are different from the latent fingerprint of FIG. 13 and the impression fingerprint of FIG. 14. The intersecting points are extracted from the impression fingerprint. In FIG. 25 a large circle represents a position of a charting point, and a small oval represents a position of an intersecting point. Coordinates of corresponding points of these intersecting points on the latent fingerprint, which are shown in FIG. 24, are calculated by proportional calculation.

Figure 26:
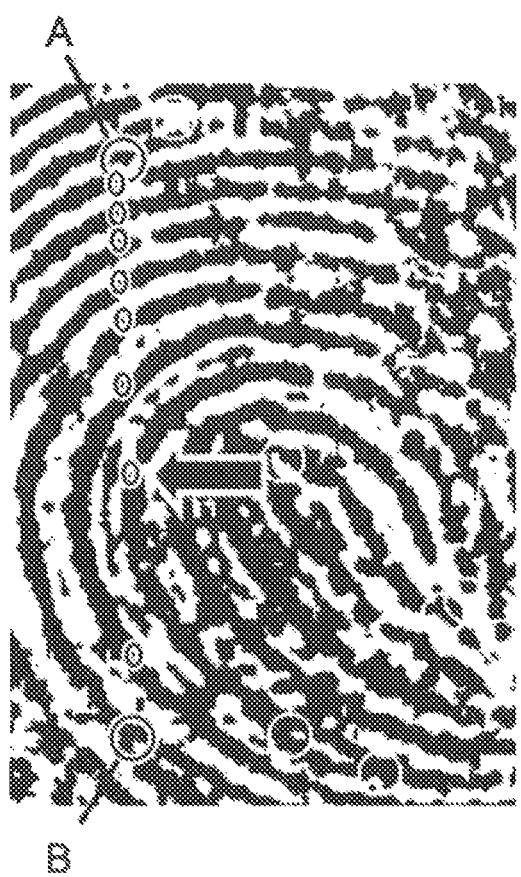
Figure 27:
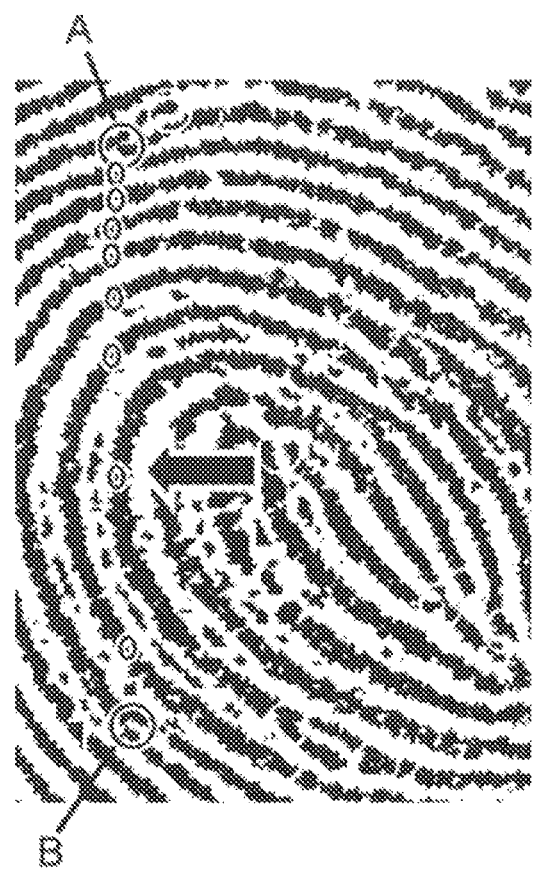

On the other hand, FIG. 26 and FIG. 27 are a latent fingerprint and an impression fingerprint for which transformation by the linear transformation and the nonlinear transformation are performed, in each of which those overlaid charting points and extracted intersecting points are overlaid and displayed. Through the nonlinear transformation, the coordinates in each of the images match for each of the charting points. The intersecting points shown in FIG. 25 are extracted from the impression fingerprint. On the other hand, the intersecting points shown in FIG. 26 are displayed at the same relative position as the intersecting points extracted from the image of the impression fingerprint of FIG. 27.

Comparing FIG. 24 and FIG. 26, it can be found that the intersecting points of FIG. 26 for which nonlinear transformation is performed rest on the ridge more accurately. Accordingly, amount of modification of the positions of the intersecting points decreases and verification of the intersecting points becomes easier.

Further, an effect that this example will lead to prevention of erroneous examination of a fingerprint will be described.

Figure 28:
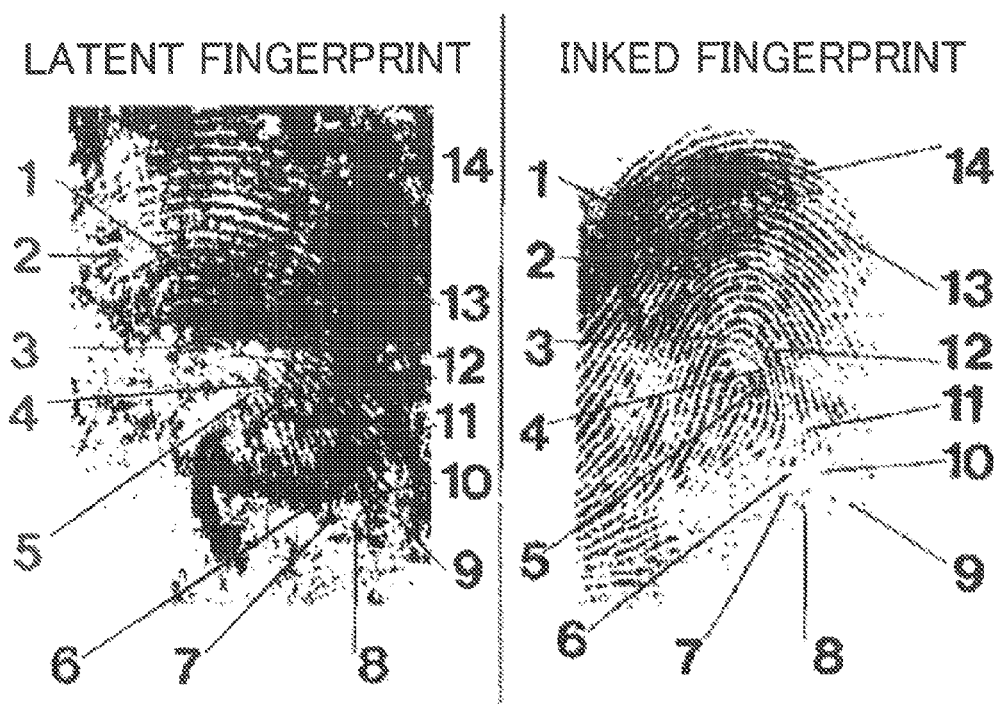
Figure 29:
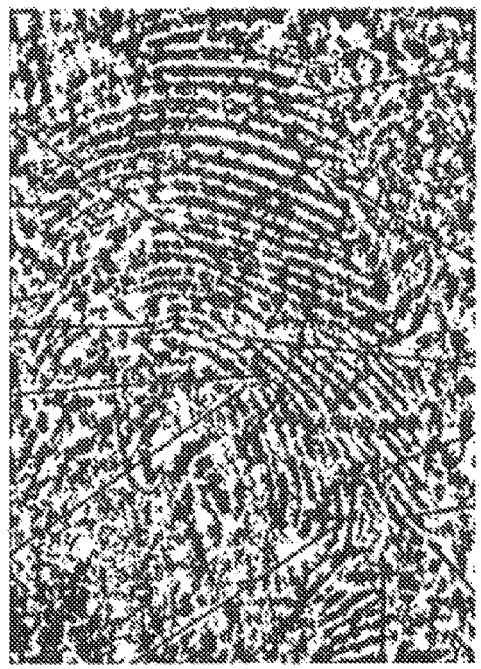
Figure 30:

FIG. 28 is an example of a charting diagram of a latent fingerprint (LATENT FINGERPRINT) and an impression fingerprint (INKED FINGERPRINT) examined as an identical fingerprint erroneously. Characters, numbers and straight lines which indicate charting points in the figure were written by an examiner. These fingerprints are different fingerprints actually. Also, FIG. 29 and FIG. 31 are the latent fingerprint and the impression fingerprint of FIG. 28 respectively, in each of which size and contrast are enlarged.

The examiner who created the charting diagram of FIG. 28 performed the examination that these fingerprints are identical because of the judgment in which fourteen charting points shown in FIG. 28 are corresponding feature points.

Figure 31:
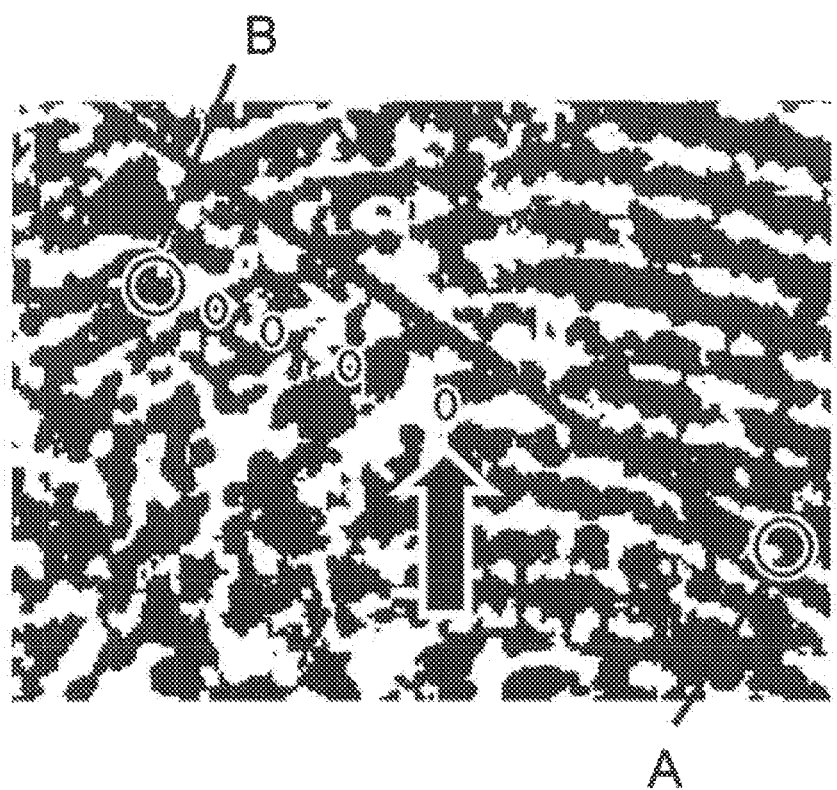
Figure 32:
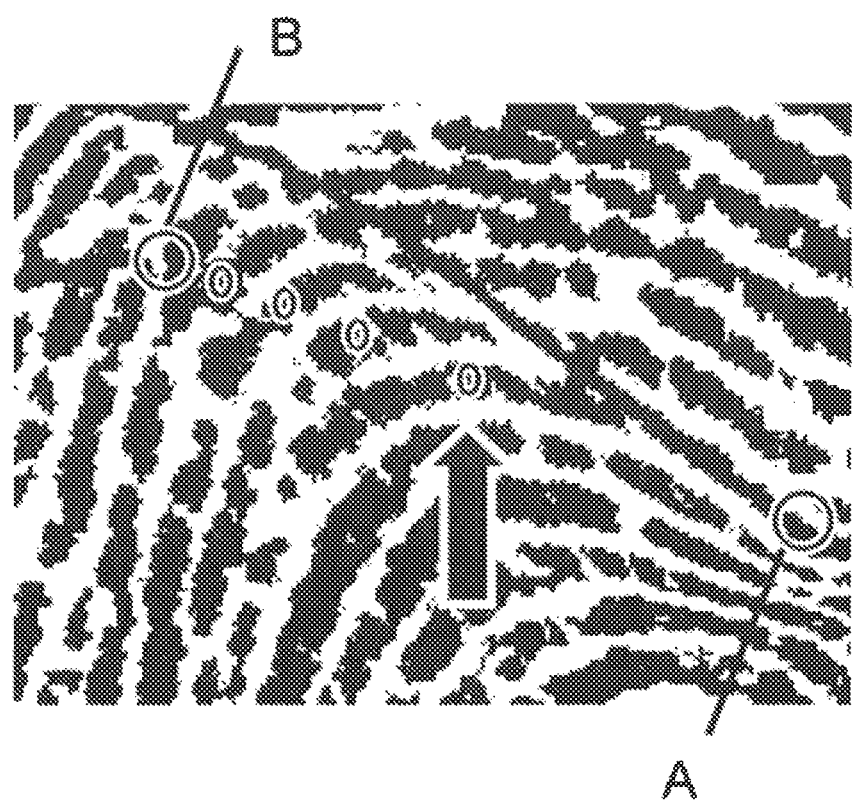
Figure 33:
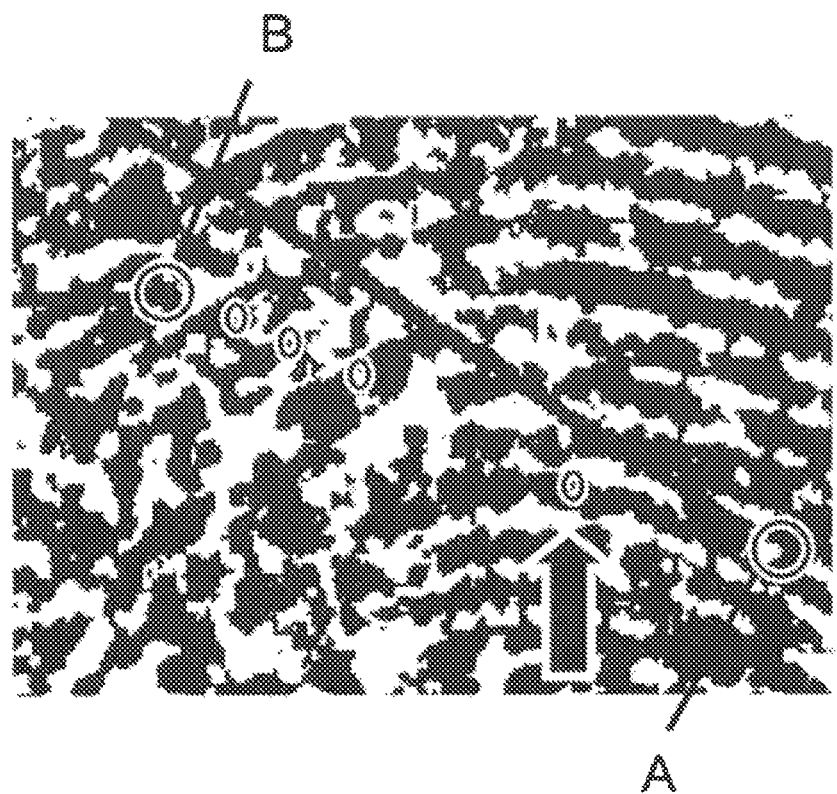

Examples of display of intersecting points between the feature points to which numbers 1 and 2 are assigned in the example of the charting diagram of FIG. 28 by the striped pattern examination support device of this example, are shown in FIGS. 31 through 33.

FIG. 32 is an example of display of intersecting points which are extracted from the impression fingerprint image for which nonlinear transformation is performed. According to FIG. 32, four intersecting points are extracted. Four extracted intersecting points rest on a ridge. Also, according to FIG. 32, there exist no other intersecting points of the line segment which connects between the feature points and the ridge.

FIG. 31 is an image of the latent fingerprint on which, at the same relative position as the intersecting points extracted from FIG. 32, figures which represent the intersecting points are overlaid and displayed.

According to FIG. 32, the intersecting point at the right end among the four intersecting points of FIG. 31 does not rest on the ridge. Now, FIG. 33 is the one where the user manually performed modification which moves this intersecting point on the line segment which connects the two feature points onto the ridge closest from the feature point on the right side.

When FIG. 32 and FIG. 33 are compared, the positions of the rightmost intersecting points differ greatly. Also, according to FIG. 33, between the rightmost intersecting point and the intersecting point next to the rightmost one, it can be found that there is a possibility that one or two ridges exist.

That is, by the striped pattern examination support device of this exemplary embodiment, the charting points in FIGS. 31-21 are found to be questionable whether they correspond. As a result, the examiner performs examination more carefully, and this leads to prevention of erroneous examination.

The exemplary embodiment mentioned above is an example to the utmost, and the scope of the present invention is not limited only to the exemplary embodiment mentioned above.

Also, the exemplary embodiment of the present invention can be realized by special-purpose hardware, a computer and a program which controls the computer or a compound structure of both of them.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application claims priority based upon and claims the benefit of priority from Japanese patent application No. 2009-193847 filed on Aug. 25, 2009, the disclosure of which is incorporated herein in its entirety by reference.

The invention claimed is:

1. A striped pattern image examination support device comprising:
    an image transformation unit which transforms at least one of two striped pattern images causing coordinates of a plurality of pairs of charting points to match in the two striped pattern images, where the pairs of charting points are two points that correspond across the two striped pattern images;
    an intersecting point extraction unit which calculates coordinates of intersecting points of stripes and a line segment which connects two of the charting points in one striped pattern image of the two striped pattern images;
    a charting diagram display unit which displays the two striped pattern images after transformation by way of the image transformation unit, and displaying a figure representing each charting point at positions corresponding to coordinates after the transformations of each of the charting points on the two striped pattern images; and
    an intersecting points display unit which displays a plurality of figures, each representing an intersecting point at positions corresponding to the coordinates calculated by the intersecting point extraction unit, on the two striped pattern images after the transformations displayed by the charting diagram display unit.

2. The striped pattern image examination support device according to claim 1 further comprising:
    striped pattern image quality determination unit which determines image quality for the two striped pattern images, wherein
    the intersecting point extraction unit calculates the coordinates of the intersecting point from one of the two striped pattern images, of which image quality is determined to be higher than other striped pattern image.

3. The striped pattern image examination support device according to claim 1 further comprising:
    intersecting point coordinate modification unit which modifies the coordinates of the intersecting points in at least one of the two striped pattern images.

4. The striped pattern image examination support device according to claim 1 further comprising:
    double cursor unit which displays a second cursor, when a first cursor of a pointing device is located at a position on one of the two striped pattern images which the charting diagram display unit displays, also on other striped pattern image at a position which corresponds to the position of the first cursor.

5. A striped pattern image examination support method comprising:
    transforming at least one of two striped pattern images so as to cause coordinates of a plurality of pairs of charting points to match in the two striped pattern images, where the pair of charting points are the points that correspond across the two striped pattern images;
    calculating coordinates of intersecting points of stripes and a line segment which connects two of the charting points in one striped pattern image of the two striped pattern images;
    displaying the two striped pattern images after the transformation, and displaying a figure representing each charting point at positions corresponding to the coordinates calculated of each of the charting points on the two striped pattern images; and
    displaying a plurality of figures, each representing an intersecting point at positions corresponding to coordinates after the transformations of the intersecting points, on the two striped pattern images after the transformations.

6. The striped pattern image examination support method according to claim 5 further comprising:
    determining image quality for the two striped pattern images; and
    calculating the coordinates of the intersecting point from one of the two striped pattern images, of which image quality is determined to be higher than other striped pattern image.

7. The striped pattern image examination support method according to claim 5 further comprising:
    modifying the coordinates of the intersecting point in at least one of the two striped pattern images.

8. The striped pattern image examination support method according to claim 5 further comprising:
    displaying a second cursor, when a first cursor of a pointing device is located at a position on one of the two striped pattern images displayed, also on the other striped pattern image at a position which corresponds to the position of the first cursor.

9. A non-transitory computer readable medium embodying a striped pattern image examination support program which makes a computer operate as:
    an image transformation unit which transforms at lest one striped pattern image of either of two striped pattern images so as to cause coordinates of a plurality of pairs of charting points to match in the two striped pattern images, where the pair of charting points are the points that correspond across the two striped pattern images;
    an intersecting point extraction unit which calculates coordinates of intersecting points of stripes and a line segment which connects two of the charting points in one striped pattern image of the two striped pattern images;

a charting diagram display unit which displays the two striped pattern images after transformation by way of the image transformation unit, and displays a figure representing each charting point at positions corresponding to coordinates after the transformations of each of the charting points on the two striped pattern images; and an intersecting point display unit which displays a plurality of figures, each representing an intersecting point at positions corresponding to the coordinates calculated by the intersecting point extraction unit, on the two striped pattern images after the transformations displayed by the charting diagram display unit.

10. The non-transitory computer readable medium according to claim 9 embodying the striped pattern image examination support program which makes a computer further operates as:

a striped pattern image quality determination unit which determines image quality for the two striped pattern images; wherein the intersecting point extraction unit calculates the coordinates of the intersecting point from one of the two striped pattern image, of which image quality is determined to be higher than other striped pattern image.

11. The non-transitory computer readable medium according to claim 9 embodying the striped pattern image examination support program which makes a computer further operates as:

an intersecting point coordinate unit which modifies the coordinates of the intersecting point in at least one of the two striped pattern images.

12. The non-transitory computer readable medium according to claim 9 embodying the striped pattern image examination support program which makes a computer further operates as:

a double cursor unit which displays a second cursor, when a first cursor of a pointing device is located at a position on one of the two striped pattern images which the charting diagram display unit displays, also on other striped pattern image at a position corresponding to the position of the first cursor.

* * * * *